US010645633B2

(12) United States Patent
Chen et al.

(10) Patent No.: US 10,645,633 B2
(45) Date of Patent: May 5, 2020

(54) ACCESS CONTROL METHOD AND DEVICE

(71) Applicant: CHINA MOBILE COMMUNICATIONS GROUP CO., LTD., Beijing (CN)

(72) Inventors: Ningyu Chen, Beijing (CN); Nan Hu, Beijing (CN); Zhuo Chen, Beijing (CN)

(73) Assignee: CHINA MOBILE COMMUNICATIONS GROUP CO., LTD., Beijing (CN)

(*) Notice: Subject to any disclaimer, the term of this patent is extended or adjusted under 35 U.S.C. 154(b) by 41 days.

(21) Appl. No.: 15/751,769

(22) PCT Filed: Jun. 12, 2016

(86) PCT No.: PCT/CN2016/085447
§ 371 (c)(1),
(2) Date: Feb. 9, 2018

(87) PCT Pub. No.: WO2017/024885
PCT Pub. Date: Feb. 16, 2017

(65) Prior Publication Data
US 2018/0234909 A1 Aug. 16, 2018

(30) Foreign Application Priority Data
Aug. 13, 2015 (CN) .......................... 2015 1 0497555

(51) Int. Cl.
*H04W 48/06* (2009.01)
*H04W 28/02* (2009.01)
(Continued)

(52) U.S. Cl.
CPC ........... *H04W 48/06* (2013.01); *H04W 28/02* (2013.01); *H04W 48/08* (2013.01); *H04W 76/10* (2018.02)

(58) Field of Classification Search
CPC ..... H04W 48/06; H04W 28/02; H04W 48/08; H04W 76/10
See application file for complete search history.

(56) References Cited

U.S. PATENT DOCUMENTS

2015/0117213 A1* 4/2015 Pinheiro ........... H04W 28/0284
370/235
2015/0289195 A1* 10/2015 Gogic ................... H04W 48/06
370/230
(Continued)

FOREIGN PATENT DOCUMENTS

CN 101969635 A 2/2011
CN 103379659 A 10/2013
(Continued)

OTHER PUBLICATIONS

English Translation of the International Search Report in international application No. PCT/CN2016/085447, dated Aug. 31, 2016.
(Continued)

*Primary Examiner* — Thai Nguyen
(74) *Attorney, Agent, or Firm* — Syncoda LLC; Feng Ma

(57) ABSTRACT

Provided are an access control method and device. The access control method includes: after a first connection of a first application has been established between a terminal and a network, obtaining identification information of a second application before performing ACDC determination for the second application; according to the identification information, obtaining a blocking parameter of the second application; according to the blocking parameter, performing ACDC determination for the second application, and obtaining a determination result for whether the second application is allowed to perform network communication or not; when the determination result indicates that the second application is allowed to perform network communication, establishing a second connection between the terminal and the network
(Continued)

for the second application, or allowing the second application to transmit information on the first connection.

14 Claims, 19 Drawing Sheets

(51) Int. Cl.
*H04W 48/08* (2009.01)
*H04W 76/10* (2018.01)

(56) References Cited

U.S. PATENT DOCUMENTS

| | | |
|---|---|---|
| 2015/0365516 A1 | 12/2015 | Aoyagi et al. |
| 2016/0066259 A1 | 3/2016 | Guo et al. |
| 2016/0219493 A1* | 7/2016 | Kim ................... H04W 48/06 |

FOREIGN PATENT DOCUMENTS

| | | |
|---|---|---|
| CN | 103733688 A | 4/2014 |
| CN | 103843408 A | 6/2014 |
| CN | 104322108 A | 1/2015 |
| CN | 104427574 A | 3/2015 |
| CN | 104717693 A | 6/2015 |
| CN | 104737590 A | 6/2015 |
| CN | 104754690 A | 7/2015 |
| WO | 2014112302 A1 | 7/2014 |

OTHER PUBLICATIONS

English Translation of the Written Opinion of the International Search Authority in international application No. PCT/CN2016/085447, dated Aug. 31, 2016.
"3GPP TS 22.011 V13.2.0" Jun. 30, 2015, as cited in CNOA1 mailed on Mar. 20, 2019 in CN201510497555.6.

* cited by examiner

ACCESS CONTROL METHOD AND DEVICE

CROSS-REFERENCE TO RELATED APPLICATION

The present application claims priority to Chinese Patent Application No. 201510497555.6, filed on Aug. 13, 2015, the content of which is hereby incorporated by reference in its entirety.

TECHNICAL FIELD

The present disclosure relates to the technical field of wireless communications, and particularly to an access control method and device.

BACKGROUND

ACDC, the abbreviation of "Application specific Congestion control for Data Communication", is an access control mechanism, and an operating company may allow or block an access request of specific application software when UE (terminal) is in an idle state. ACDC is only applicable to UE in an idle state and inapplicable to UE in a connected state. ACDC plays a role in reducing an overload of an access network or a core network.

It has the following basic characteristics.

1) ACDC is applicable to a Universal Mobile Telecommunications System (UMTS) Terrestrial Radio Access Network (URAN) and an Evolved UTRAN (E-UTRAN).

2) A home network configures at least four ACDC categories corresponding to applications defined by an operating company respectively for UE.

3) Enabling an ACDC category in the UE is a responsibility of the home network, and how to categorize is not defined by the 3rd Generation Partnership Project (3GPP).

4) The UE has a set of mechanism to verify that it is a trusted source enabling the ACDC category for it.

5) A service network broadcasts control information on an access network side, including: blocking information of each ACDC category and whether roaming UE should be limited to ACDC or not.

6) Blocking information broadcast in each cell is different, and a corresponding relationship between an application in the UE and an ACDC category is configured by the home network.

7) The UE may determine whether to allow transmission of an access request of a specific application on the basis of the broadcast blocking information and an ACDC category configuration in the UE.

8) The service network should indicate ACDC at the same time of executing other access control, and when ACDC and Access Class Barring (ACB) are indicated at the same time, ACDC should cover ACB.

9) When multiple core networks share the same access network, the access network should be capable of independently executing ACDC for different core networks respectively. For alleviating congestion of a shared access network and for fairness, the same blocking rate should be set for different operating companies.

ACDC Category Configuration

An operating system of UE allocates an application software Identity (id) for each piece of application software, and the UE obtains a corresponding relationship between the application software ids and ACDC categories by receiving a broadcast of a home network or by virtue of remote Subscriber Identity Module (SIM) card writing of an core network. Multiple different application software ids may correspond to the same ACDC category.

The home network configures the ACDC application categories for the UE:

1: an application which is limited least (with a highest access priority) is configured into a highest ACDC category, i.e. ACDC #1;

2: an application which is limited more than ACDC #1 is configured into a second highest ACDC category, i.e. ACDC #2, and so on; and 3: an application which is limited most (with a lowest access priority) is configured into a lowest ACDC category, or is configured into no ACDC category.

The application which is configured into no ACDC category on the UE should be considered by the UE to be the lowest ACDC category. When ACDC is used, a service network broadcasts blocking information, and the blocking information is sent sequentially from the highest to lowest ACDC categories. The home network and the service network may use different categorization methods. The service network determines whether to apply ACDC to roaming UE or not.

A number of ACDC categories on UE may be different from a number of ACDC categories broadcast by a service network. Such a circumstance may occur when the UE roams, and the number of the ACDC categories broadcast by the service network is different from a home network of the UE. For such a circumstance, the following strategies are adopted.

A: when the number of the ACDC categories broadcast by the service network is more than that configured by the UE, the UE uses blocking information corresponding to ACDC, adopts blocking information of a lowest category in a broadcast of a serving cell for an uncategorized application, and ignores other blocking information mismatched with own ACDC category.

B: when a number of ACDC categories corresponding to blocking information broadcast by the service network is smaller than own configuration of the UE, the UE adopts the corresponding blocking information for a matched ACDC category, and adopts blocking information of the lowest category in the serving cell for another application.

It is important to note that a matched ACDC category refers to that an ACDC category sequence of blocking information broadcast by the service network is the same as an ACDC category sequence configured by the UE.

ACDC Process in a Service Network

The service network sequentially broadcasts ACDC blocking parameters of different categories, including a "blocking time" and a "blocking probability".

The blocking time: when an ACDC category corresponding to application software a is #1 and a broadcast blocking time of ACDC #1 is 100 ms, once a connection request of the application software a is blocked by an ACDC strategy, the connection request of the application software 2 will always be blocked within the blocking time 100 ms.

The blocking probability: when an ACDC category corresponding to application software b is #2 and a broadcast blocking probability of ACDC #2 is 0.6, when the application software b initiates a connection request, UE generates a random number between 0-1 for it, when the random number is smaller than or equal to 0.6, access is allowed, and when it is larger than 0.6, access is rejected.

ACDC executes access control for different application software, but ACDC has the following shortcoming.

ACDC may make an admission judgment only in an idle state. When there is an application allowed to access a network, no more ACDC judgment will be made before Radio Resource Control (RRC) is disconnected, and another application with a low priority may directly access the network without ACDC judgments. This is unfavorable for respective management and control over different application software and unfavorable for fairness of priorities between applications.

SUMMARY

The technical problem to be solved by the disclosure is to provide an access control method and device, which are adopted to solve the problem that present ACDC makes an admission judgment only when a terminal is in an idle state, when there is an application allowed to be access a network, no more ACDC judgment will be made before RRC is disconnected, another application with a low priority may directly access the network without ACDC judgments and such a manner is unfavorable for respective management and control over different applications and damages fairness of priorities between the applications.

In order to solve the technical problem, embodiments of the disclosure provide an access control method of ACDC. The method may include the following actions.

After a first connection of a first application is established between a terminal and a network and before an ACDC judgment is made for a second application, identification information of the second application is acquired.

A blocking parameter of the second application is acquired according to the identification information.

The ACDC judgment is made for the second application according to the blocking parameter, to obtain a judgment result indicating whether the second application is allowed to perform network communication.

When the judgment result indicates that the second application is allowed to perform network communication, a second connection between the terminal and the network is established for the second application or the second application is allowed to deliver information on the first connection.

According to an embodiment, the first application and the second application may be classified according to application software categories, or may be classified according to service types.

According to an embodiment, the action of acquiring the blocking parameter of the second application according to the identification information may include the following actions.

An ACDC category of the second application is acquired according to the identification information.

The blocking parameter of the second application is acquired according to the ACDC category.

The blocking parameter may include at least one of a blocking time or a blocking probability.

According to an embodiment, the access control method may further include the following actions.

When the judgment result indicates that the second application is not allowed to perform network communication, a blocking timer is established.

All network communication of the second application is blocked within a timing period of the blocking timer.

According to an embodiment, before the action of making the ACDC judgment for the second application according to the blocking parameter, to obtain the judgment result indicating whether the second application is allowed to perform network communication, the access control method further includes the following actions.

An ACDC category of the first application is acquired.

A priority of the ACDC category of the second application is compared with a priority of the ACDC category of the first application.

When the priority of the ACDC category of the second application is lower than the priority of the ACDC category of the first application, the ACDC judgment is made for the second application according to the blocking parameter, to obtain the judgment result indicating whether the second application is allowed to perform network communication.

When the priority of the ACDC category of the second application is higher than or equal to the priority of the ACDC category of the first application, the second connection between the UE and the network is established for the second application or the second application is allowed to deliver the information on the first connection.

According to an embodiment, before the action of making the ACDC judgment for the second application according to the blocking parameter to obtain the judgment result indicating whether the second application is allowed to perform network communication, the access control method may further include the following actions.

A priority of the ACDC category of the second application is compared with a priority of a preset ACDC category.

When the priority of the ACDC category of the second application is lower than the priority of the preset ACDC category, the ACDC judgment is made for the second application according to the blocking parameter, to obtain the judgment result indicating whether the second application is allowed to perform network communication.

When the priority of the ACDC category of the second application is higher than or equal to the priority of the preset ACDC category, the second connection between the UE and the network is established for the second application or the second application is allowed to deliver the information on the first connection.

According to an embodiment, when the access control method is applied to the UE, the action of acquiring the identification information of the second application after the first connection of the first application is established between the UE and the network and before the ACDC judgment is made for the second application may include the following action.

When a network access request of the second application is acquired, the identification information of the second application is acquired.

According to an embodiment, the action of acquiring the ACDC category of the second application according to the identification information may include the following actions.

An application and ACDC category corresponding table configured by a local network is acquired, where the application and ACDC category corresponding table includes identification information of all applications configured by the local network and an ACDC category corresponding to the identification information of each of the applications.

The application and ACDC category corresponding table is searched, according to the identification information of the second application, for the ACDC category of the second application corresponding to the identification information.

According to an embodiment, before the action of acquiring the blocking parameter of the second application according to the ACDC category, the access control method may further include the following actions.

A correspondence table of ACDC categories and blocking parameters, transmitted by an RRC layer and acquired from a broadcast of a service network is acquired, where the correspondence table of ACDC categories and blocking parameters includes ACDC categories and a blocking parameter corresponding to each of the ACDC categories.

The action of acquiring the blocking parameter of the second application according to the ACDC category may include the following action.

The blocking parameter of the second application is acquired from the correspondence table of ACDC categories and blocking parameters according to the ACDC category.

According to an embodiment, the action of acquiring the ACDC category of the second application according to the identification information may include the following actions.

A network connection request of the second application and the ACDC category corresponding to the second application are received from a Non-Access Stratum (NAS), where the ACDC category corresponding to the second application is obtained by the NAS through searching the application and ACDC category corresponding table configured by the local network according to the identification information.

According to an embodiment, the action of acquiring the blocking parameter of the second application according to the ACDC category may include the following actions.

The correspondence table of ACDC categories and blocking parameters, acquired from the broadcast of the service network, is searched, according to the ACDC category, for a blocking parameter corresponding to the ACDC category of the second application.

According to an embodiment, the action of establishing the second connection between the terminal and the network for the second application or allowing the second application to deliver the information on the first connection may include the following action.

Information indicating that the second application is allowed to access the network is sent to the NAS to enable the NAS to establish the second connection between the terminal and the network for the second application or allow the second application to deliver the information on the first connection.

According to an embodiment, when the access control method is applied to a base station, the action of acquiring the identification information of the second application after the first connection of the first application is established between the terminal and the network and before the ACDC judgment is made for the second application may include the following action.

Upon reception of RRC-layer signaling which is sent by the terminal and contains an application establishment request of the second application and the identification information of the second application, the RRC-layer signaling is parsed to obtain the identification information or ACDC category of the second application.

According to an embodiment, the action of establishing the second connection between the terminal and the network for the second application or allowing the second application to deliver the information on the first connection may include the following action.

The ACDC judgment result indicating that the second application is allowed to perform network communication is sent to the terminal to enable the terminal to establish the second connection with the network or allow the second application to continue delivering the information on the first connection.

According to an embodiment, when the access control method is applied to the base station, the action of acquiring the identification information of the second application after the first connection of the first application is established between the terminal and the network and before the ACDC judgment is made for the second application may include the following actions.

NAS signaling sent by the terminal and including a bearer establishment request of the second application or data of the second application sent on the first connection, is acquired, and the NAS signaling is transmitted to a core network.

The identification information of the second application, obtained by the core network according to the NAS signaling, is received.

According to an embodiment, the action of establishing the second connection between the terminal and the network for the second application or allowing the second application to deliver the information on the first connection may include the following action.

The ACDC judgment result indicating that the second application is allowed to perform network communication is sent to the terminal through the core network to enable the terminal to establish the second connection with the network or allow the second application to continue delivering the information on the first connection.

According to an embodiment, when the access control method is applied to the core network, the action of acquiring the identification information of the second application after the first connection of the first application is established between the terminal and the network and before the ACDC judgment is made for the second application may include the following action.

Upon reception of the NAS signaling sent by the terminal through the base station and including the bearer establishment request of the second application or the data of the second application sent on the first connection, the identification information of the second application is acquired.

According to an embodiment, the action of establishing the second connection between the terminal and the network for the second application or allowing the second application to deliver the information on the first connection may include the following action.

The ACDC judgment result indicating that the second application is allowed to perform network communication is sent to the terminal through the base station to enable the terminal to establish the second connection with the network or allow the second application to continue delivering the information on the first connection.

The embodiments of the disclosure provide an access control device of ACDC. The access control device may include a first acquisition module, a second acquisition module, a judgment module and a communication module.

The first acquisition module is arranged to, after a first connection of a first application is established between terminal and a network and before an ACDC judgment is made for a second application, acquire identification information of the second application.

The second acquisition module is arranged to acquire a blocking parameter of the second application according to the identification information.

The judgment module is arranged to make the ACDC judgment for the second application according to the blocking parameter to obtain a judgment result indicating whether the second application is allowed to perform network communication.

The communication module is arranged to, when the judgment result indicates that the second application is allowed to perform network communication, establish a second connection between the terminal and the network for the second application or allow the second application to deliver information on the first connection.

According to an embodiment, the first application and the second application may be classified according to application software categories, or may be classified according to service types.

According to an embodiment, the second acquisition module may include a category acquisition unit and a blocking parameter acquisition unit.

The category acquisition unit is arranged to acquire an ACDC category of the second application according to the identification information.

The blocking parameter acquisition unit is arranged to acquire the blocking parameter of the second application according to the ACDC category.

The blocking parameter may include at least one of a blocking time or a blocking probability.

According to an embodiment, the access control device may further include a blocking timer establishment module and a blocking module.

The blocking timer establishment module is arranged to, when the judgment result indicates that the second application is not allowed to perform network communication, establish a blocking timer.

The blocking module is arranged to block all network communication of the second application within a timing period of the blocking timer.

According to an embodiment, the access control device may further include a category acquisition module and a first comparison module.

The category acquisition module is arranged to acquire an ACDC category of the first application.

The first comparison module is arranged to compare a priority of the ACDC category of the second application with a priority of the ACDC category of the first application;

When the priority of the ACDC category of the second application is lower than the priority of the ACDC category of the first application, the judgment module may make the ACDC judgment for the second application according to the blocking parameter to obtain the judgment result indicating whether the second application is allowed to perform network communication.

When the priority of the ACDC category of the second application is higher than or equal to the priority of the ACDC category of the first application, the communication module may establish the second connection between the terminal and the network for the second application or allow the second application to deliver the information on the first connection.

According to an embodiment, the access control device may further include a second comparison module.

The second comparison module is arranged to compare a priority of the ACDC category of the second application with a priority of a preset ACDC category.

When the priority of the ACDC category of the second application is lower than the priority of the preset ACDC category, the judgment module may make the ACDC judgment for the second application according to the blocking parameter to obtain the judgment result indicating whether the second application is allowed to perform network communication.

When the priority of the ACDC category of the second application is higher than or equal to the priority of the preset ACDC category, the communication module may establish the second connection between the terminal and the network for the second application or allow the second application to deliver the information on the first connection.

According to an embodiment, when the access control device is applied to the terminal, the first acquisition module may be arranged to:

when a network access request of the second application is acquired, acquire the identification information of the second application.

According to an embodiment, the category acquisition unit may include a first acquisition subunit and a second acquisition subunit.

The first acquisition subunit is arranged to acquire an application and ACDC category corresponding table configured by a local network, where the application and ACDC category corresponding table includes identification information of all applications configured by the local network and an ACDC category corresponding to the identification information of each of the applications.

The second acquisition subunit is arranged to search, according to the identification information of the second application, the application and ACDC category corresponding table for the ACDC category of the second application corresponding to the identification information.

According to an embodiment, the second acquisition module may further include a first acquisition unit.

The first acquisition unit is arranged to acquire a correspondence table of ACDC categories and blocking parameters, transmitted by an RRC layer and acquired from a broadcast of a service network, where the correspondence table of ACDC categories and blocking parameters includes ACDC categories and a blocking parameter corresponding to each of the ACDC categories.

The blocking parameter acquisition unit may be arranged to:

acquire the blocking parameter of the second application from the correspondence table of ACDC categories and blocking parameters according to the ACDC category.

According to an embodiment, the category acquisition unit may be arranged to:

receive a network connection request of the second application and the ACDC category corresponding to the second application from an NAS, where the ACDC category corresponding to the second application is obtained by the NAS through searching the application and ACDC category corresponding table configured by the local network according to the identification information.

According to an embodiment, the blocking parameter acquisition unit may be arranged to:

search, according to the ACDC category, the correspondence table of ACDC categories and blocking parameters acquired from the broadcast of the service network, for a blocking parameter corresponding to the ACDC category of the second application.

According to an embodiment, the communication module may be arranged to:

send, to the NAS, information indicating that the second application is allowed to access the network to enable the NAS to establish the second connection between the terminal and the network for the second application or allow the second application to deliver the information on the first connection.

According to an embodiment, when the access control device is applied to an base station, the first acquisition module may be arranged to:

upon reception of RRC-layer signaling which is sent by the terminal and contains an application establishment request of the second application and the identification information of the second application, parse the RRC-layer signaling to obtain the identification information or ACDC category of the second application.

According to an embodiment, the communication module may be arranged to:

send, to the terminal, the ACDC judgment result indicating that the second application is allowed to perform network communication to enable the terminal to establish the second connection with the network or allow the second application to continue delivering the information on the first connection.

According to an embodiment, when the access control device is applied to the base station, the first acquisition module may include a signaling acquisition unit and a receiving unit.

The signaling acquisition unit is arranged to acquire NAS signaling sent by the terminal and including a bearer establishment request of the second application or data of the second application sent on the first connection, and transmit the NAS signaling to an core network.

The receiving unit is arranged to receive the identification information, obtained by the core network according to the NAS signaling, of the second application.

According to an embodiment, the communication module may be arranged to:

send, to the terminal through the core network, the ACDC judgment result indicating that the second application is allowed to perform network communication to enable the terminal to establish the second connection with the network or allow the second application to continue delivering the information on the first connection.

According to an embodiment, when the access control device is applied to the core network, the first acquisition module may be arranged to:

upon reception of the NAS signaling sent by the terminal through the base station and including the bearer establishment request of the second application or the data of the second application sent on the first connection, acquire the identification information of the second application.

According to an embodiment, the communication module may be arranged to:

send the ACDC judgment result indicating that the second application is allowed to perform network communication to the terminal through the base station to enable the terminal to establish the second connection with the network or allow the second application to continue delivering the information on the first connection.

The disclosure has the following beneficial effects.

According to the solutions, when each application accesses the network for the first time, an ACDC judgment corresponding to the application may be made, and such a manner solves the problem of free-riding of a low-priority application, facilitates respective control over different applications and ensures fairness of priorities between the applications.

DETAILED DESCRIPTION

In order to make the purpose, technical solutions and advantages of the disclosure clearer, the disclosure will be described below in combination with the drawings and specific embodiments in detail.

For the problem that present ACDC makes an admission judgment only when terminal is in an idle state, when there is an application allowed to be access a network, no more ACDC judgment will be made before RRC is disconnected, another application with a low priority may directly access the network without ACDC judgments and such a manner is unfavorable for respective management and control over different applications and damages fairness of priorities between the applications, the disclosure provides an access control method and device.

Figure 1:
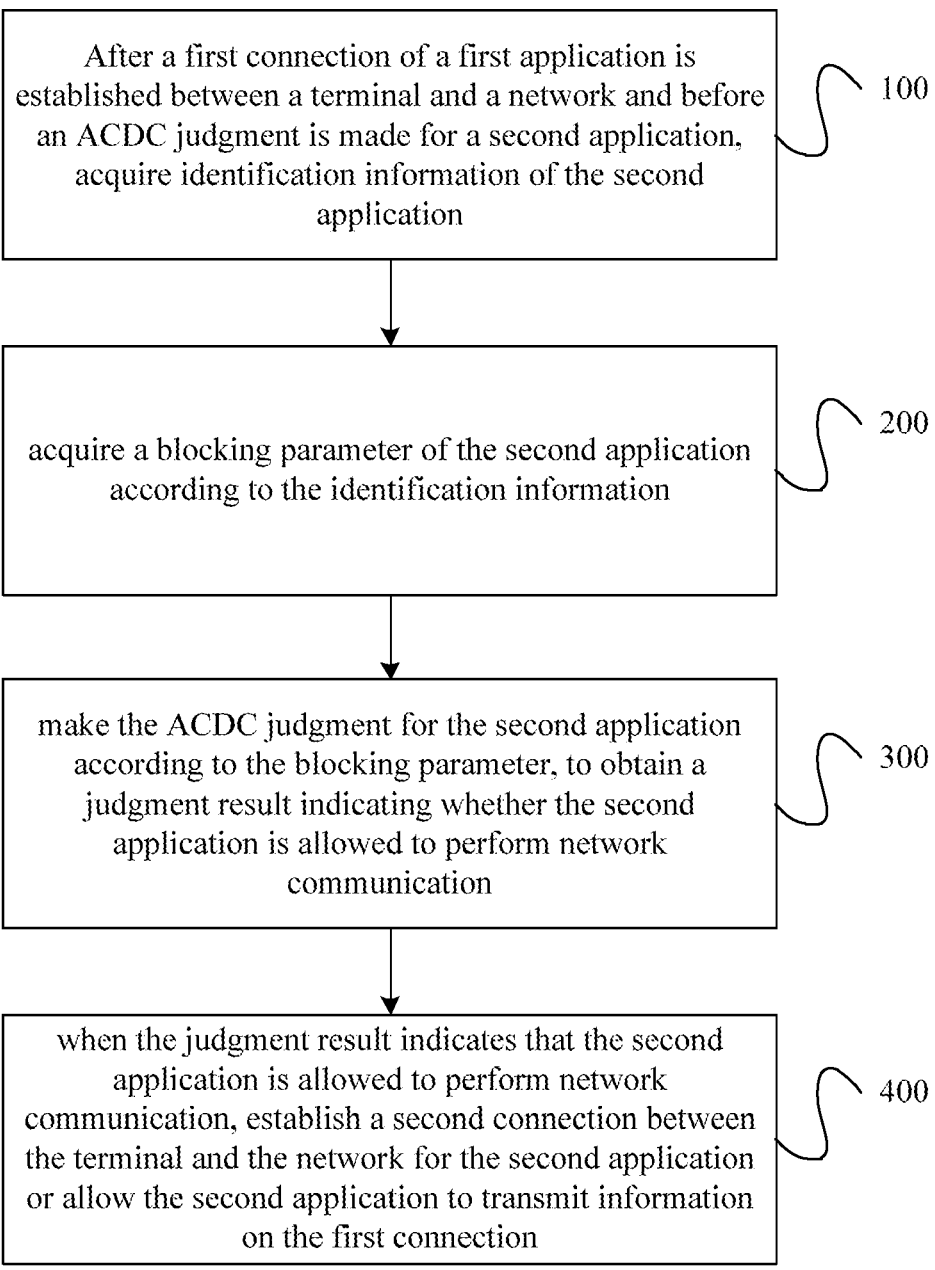
FIG. 1 is a flowchart of an access control method according to embodiment 1 of the disclosure.

As shown in FIG. 1, an access control method of ACDC of embodiment 1 of the disclosure includes the following steps.

In Step 100, after a first connection of a first application is established between UE and a network and before an ACDC judgment is made for a second application, identification information of the second application is acquired.

In Step 200, a blocking parameter of the second application is acquired according to the identification information.

In Step 300, the ACDC judgment is made for the second application according to the blocking parameter, and a judgment result indicating whether the second application is allowed to perform network communication or not is obtained.

In Step 400, when the judgment result indicates that the second application is allowed to perform network communication, a second connection between the terminal and the network is established for the second application or the second application is allowed to deliver information on the first connection.

It is important to note that, in embodiment 1, once there is a network access requirement of a new application, it is necessary to make an ACDC judgment for the new application, and only when ACDC judgment succeeds, a connection between the new application and the network may be established. Such a manner avoids the problem of free-riding of the new application due to the fact that the new application may directly access the network on the basis of a connection of another application when the other application has accessed the network.

It is important to note that, in the embodiment, the applications may be classified according to application software categories, for example, WeChat and QQ, and may also be classified according to transmitted service types, for example, a session type, a streaming media type, an interactive type, a background type, interactive media, an Internet Protocol Television (IPTV), Internet Protocol (IP) Multimedia Subsystem (IMS) (which is a completely new multimedia service form) signaling, a File Transfer Protocol (FTP) and a Hyper Text Transfer Protocol (HTTP).

The connections in the first connection and the second connection may be wireless connections (mainly referring to that the applications are in a 2nd-Generation (2G)/3rd-Generation (3G) network), and may also be wireless bearers (when being applied to a Long-Term Evolution (LTE) network).

It is important to note that a specific implementation manner of Step 200 is as follows:

an ACDC category of the second application is acquired according to the identification information; and the blocking parameter of the second application is acquired according to the ACDC category, wherein the blocking parameter includes at least one of a blocking time or a blocking probability.

It is important to note that the ACDC category and the blocking parameter are defined and allocated by a network side according to an operation condition of the existing network.

Step 300 is an ACDC judgment process, and an implementation manner for such a judgment is well known by those skilled in the art, and will not be described herein in detail.

It is also important to note that, when the judgment result indicates that the second application is not allowed to perform network communication, the access control method further includes that:

a blocking timer is established; and all network communication of the second application is blocked within a timing period of the blocking timer.

The timing period is a preset blocking time, allocated by the network side in a unified manner according to a network transmission state, of each application.

When the blocking parameter includes the blocking time and the blocking parameter, the timing period of the timer may be obtained by adding a preset time to the blocking time. In embodiment 1, after the connection is established between the terminal and the network, all subsequent new applications accessing the network are not allowed to ride freely, and may perform network communication only when ACDC judgments allow the new applications to access the network.

Figure 2:
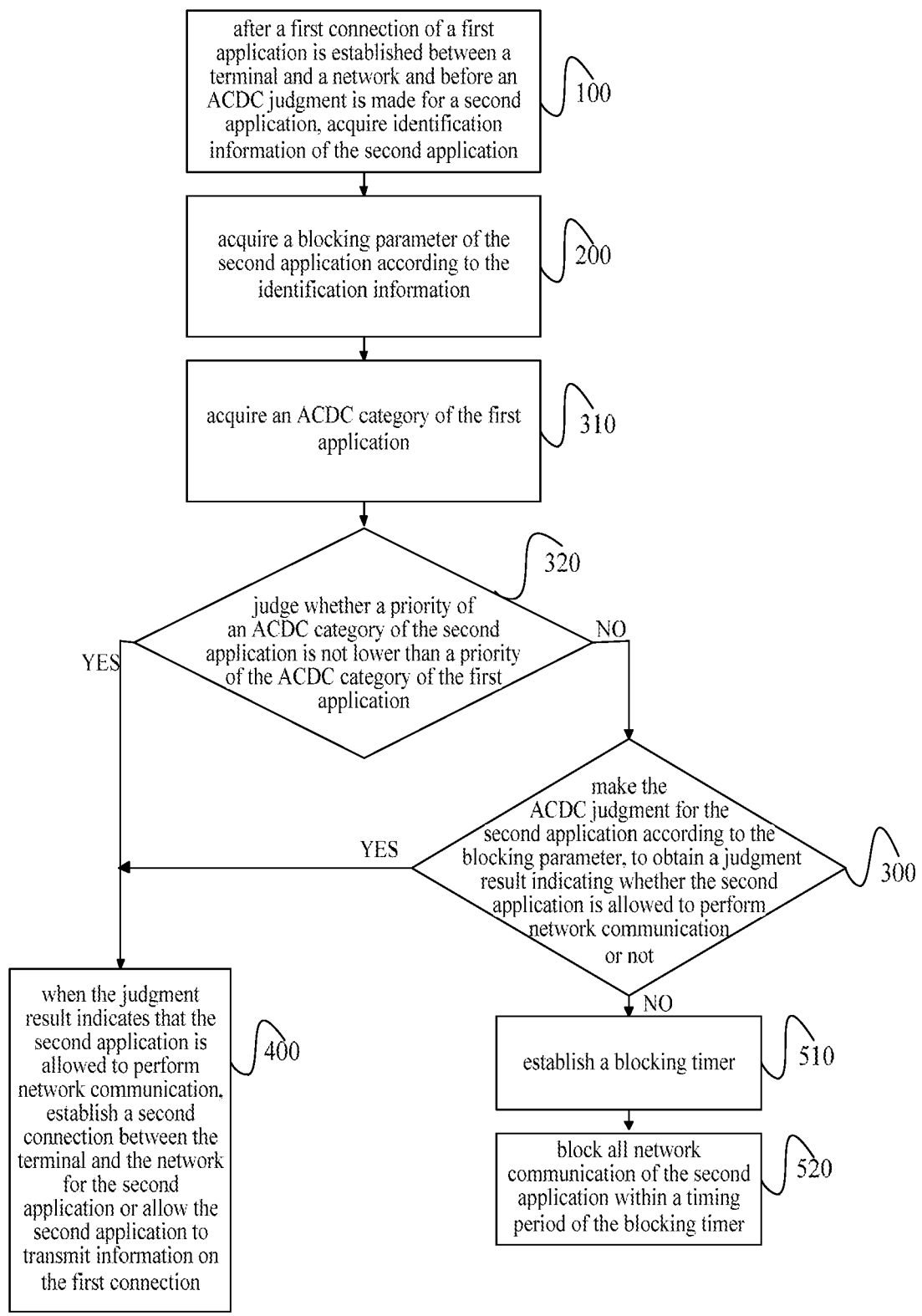
FIG. 2 is a flowchart of an access control method according to embodiment 2 of the disclosure.

The implementation manner in embodiment 1 makes it necessary to make an ACDC judgment when each new application accesses the network, and when a priority of the new application is not lower than an application which has established a network connection, such a manner is relatively applicable. However, when the priority of the new application is lower than the application which has established the network connection, adopting such a manner may not reflect an advantage of the priority of the new application. Therefore, as shown in FIG. 2, on the basis of embodiment 1, embodiment 2 of the disclosure provides an access control method, which includes the following steps.

In Step 100, after a first connection of a first application is established between terminal and a network and before an ACDC judgment is made for a second application, identification information of the second application is acquired.

In Step 200, a blocking parameter of the second application is acquired according to the identification information.

In Step 310, an ACDC category of the first application is acquired.

In Step 320, whether a priority of an ACDC category of the second application is not lower than a priority of the ACDC category of the first application or not is judged;

when the priority of the ACDC category of the second application is not lower than the priority of the ACDC category of the first application, Step 400 is executed to establish a second connection between the terminal and the network for the second application or allow the second application to deliver information on the first connection;

otherwise, Step 300 is executed to make the ACDC judgment for the second application according to the blocking parameter to obtain a judgment result indicating whether the second application is allowed to perform network communication;

when the judgment result indicates that the second application is allowed to perform network communication, Step 400 is executed; and otherwise, Step 510 is executed to establish a blocking timer.

In Step 520, all network communication of the second application is blocked within a timing period of the blocking timer.

Figure 3:
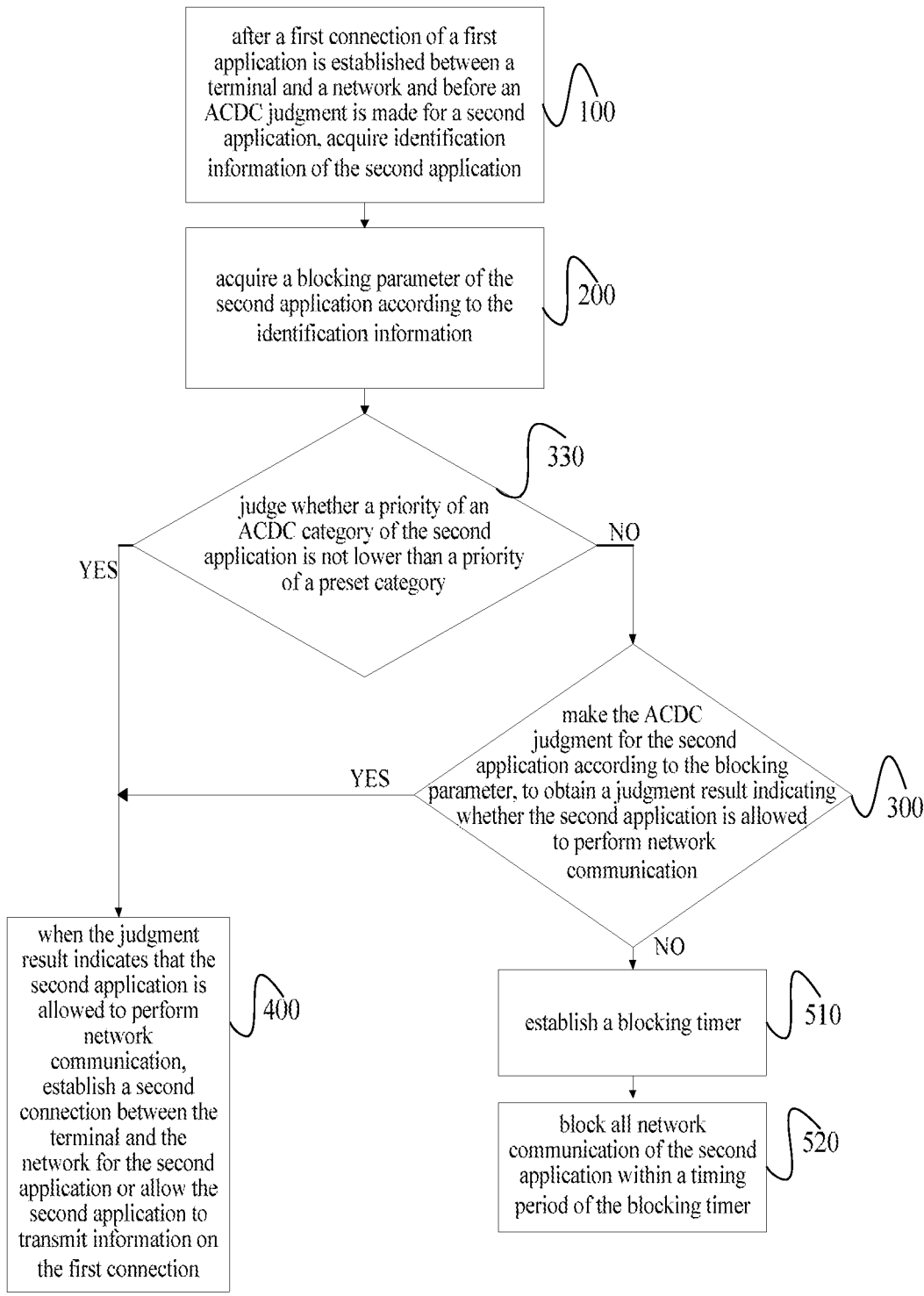
FIG. 3 is a flowchart of an access control method according to embodiment 3 of the disclosure.

In embodiment 2, a request of accessing the network is acquired from a new application at first, then priorities of a category of the new application and an original application connected to the network (such an application may be considered as an old application in the disclosure) are compared before an ACDC judgment is made for the new application, and when the priority of the new application is higher than or equal to the priority of the old application, the ACDC judgment is not made for the new application (under such a circumstance, it may be determined as a default that an ACDC judgment result of the new application indicates that network communication is allowed), and the new application may directly access the network; and only when the priority of the new application is lower than the priority of the old application, the ACDC judgment is made. Such a manner may effectively reduce ACDC judgment processes, meanwhile, ensures that an application of a higher level may smoothly perform network communication and effectively solves the problem of free-riding of an application with a low priority on the basis of an original network connection.

when a priority of an ACDC category of a first application connected to the network is highest, ACDC judgments are required to be made for all subsequent applications during network connection. Therefore, application of embodiment 2 is limited. For extending an application range of the disclosure, as shown in FIG. 3, on the basis of embodiment 1, embodiment 3 of the disclosure provides an access control method, which includes the following steps.

In Step 100, after a first connection of a first application is established between terminal and a network and before an ACDC judgment is made for a second application, identification information of the second application is acquired.

In Step 200, a blocking parameter of the second application is acquired according to the identification information.

In Step 330, whether a level of a priority of an ACDC category of the second application is not lower than a priority of a preset ACDC category or not is judged;

when the priority of the ACDC category of the second application is not lower than the priority of the preset ACDC category, Step 400 is executed to establish a second connection between the terminal and the network for the second application or allow the second application to deliver information on the first connection;

otherwise, Step 300 is executed to make the ACDC judgment for the second application according to the blocking parameter to obtain a judgment result indicating whether the second application is allowed to perform network communication;

when the judgment result indicates that the second application is allowed to perform network communication, Step 400 is executed; and otherwise, Step 510 is executed to establish a blocking timer.

In Step 520, all network communication of the second application is blocked within a timing period of the blocking timer.

It is important to note that the preset ACDC category is usually allocated and broadcast by a network side according to an operation condition of the network, and may also be pre-defined by terminal side.

In embodiment 3, the ACDC category of the second application is compared with the preset ACDC category to determine whether the second application directly accesses the network or not. Such a manner may reasonably control a number of ACDC judgments made for the application.

It is important to note that the access control method may be applied to a terminal (UE), may be applied to a base station (eNB), and may also be applied to a core network (MME) side.

When the access control method is applied to an LTE network, the applications are classified according to application software categories, and specific implementation of the access control method on different application objects will be described below in detail.

First, when the access control method is applied to the terminal

During network communication of the terminal, data may be sequentially transmitted from an upper layer to a lower layer, and the lower layer packs and encapsulates the data and then sends it to a network side. The access control method may be applied to an NAS of the terminal, and may also be applied to an RRC layer of the terminal.

1: when the access control method is applied to the NAS of the UE

Step 100 in embodiment 1, embodiment 2 or embodiment 3 is specifically implemented as follows:

when a network access request of the second application is acquired, the identification information of the second application is acquired.

It is important to note that the identification information is information identifying the application, may be an id, allocated by a local network, of the application, and may also be a target communication address of the application. In the disclosure, the identification information adopts the id of the application for description.

A specific implementation process of Step 200 includes the following steps.

In Step 201, an application and ACDC category corresponding table configured by the local network is acquired, where the application and ACDC category corresponding table includes identification information of all applications configured by the local network and an ACDC category corresponding to the identification information of each of the applications.

In Step 202, the application and ACDC category corresponding table is searched, according to the identification information of the second application, for the ACDC category of the second application corresponding to the identification information.

In Step 203, a correspondence table of ACDC categories and blocking parameters, transmitted by an RRC layer and acquired from a broadcast of a service network, is acquired, where the correspondence table of ACDC categories and blocking parameters includes ACDC categories and a blocking parameter corresponding to each of the ACDC categories.

In Step 204, the blocking parameter of the second application is acquired from the correspondence table of ACDC categories and blocking parameters according to the ACDC category.

Application processes of the access control method when the UE is in an idle state (i.e. first access of the application) and a connected state (that is, there has been an application performing network communication) will be described below in detail.

Figure 4:
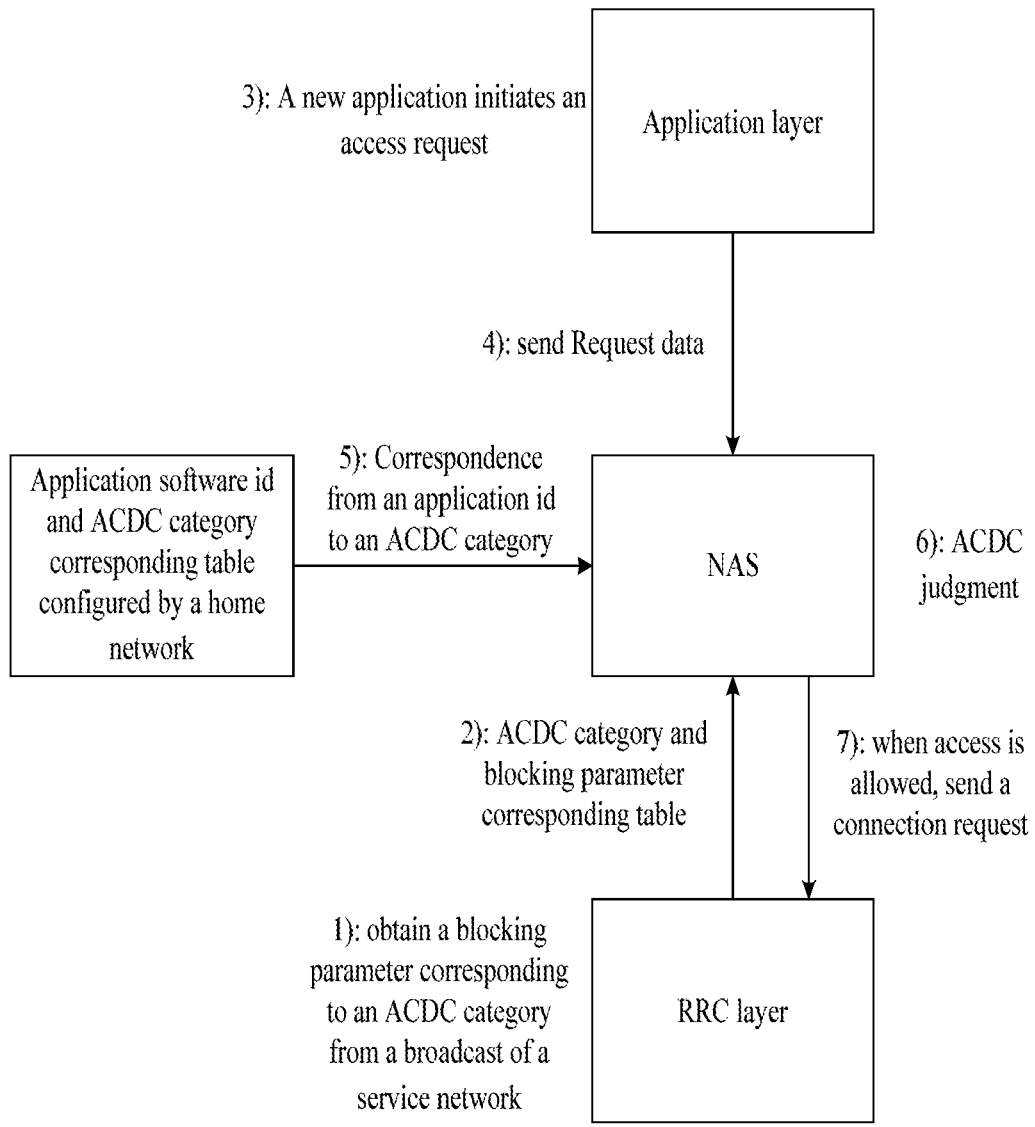
FIG. 4 is a flowchart of NAS-based ACDC judgment interlayer signaling of an access control method applied to UE side according to an embodiment of the disclosure.

As shown in FIG. 4, when the UE is in the idle state and there is an application required to perform network communication, a transmission process of NAS-based ACDC judgment interlayer signaling is as follows:

1) the RRC layer obtains a blocking parameter corresponding to an ACDC category from the broadcast of the service network;

2) the RRC layer transmits the correspondence table of ACDC categories and blocking parameters to the NAS;

3) an application layer receives an access request initiated by the new application;

4) the application layer sends request data of the new application to the NAS;

5) the NAS acquires an application id (i.e. identification information of the application) and ACDC category corresponding table configured by a home network (i.e. the local network);

6) an ACDC judgment is made in the NAS according to the ACDC category corresponding to an id of the new application and the blocking parameter corresponding to the ACDC category of the new application; and 7) when a judgment result indicates that the new application is allowed to access the network, the connection request of the new application is sent to the RRC layer, and the RRC layer establishes a connection between the UE and the network.

Figure 5:
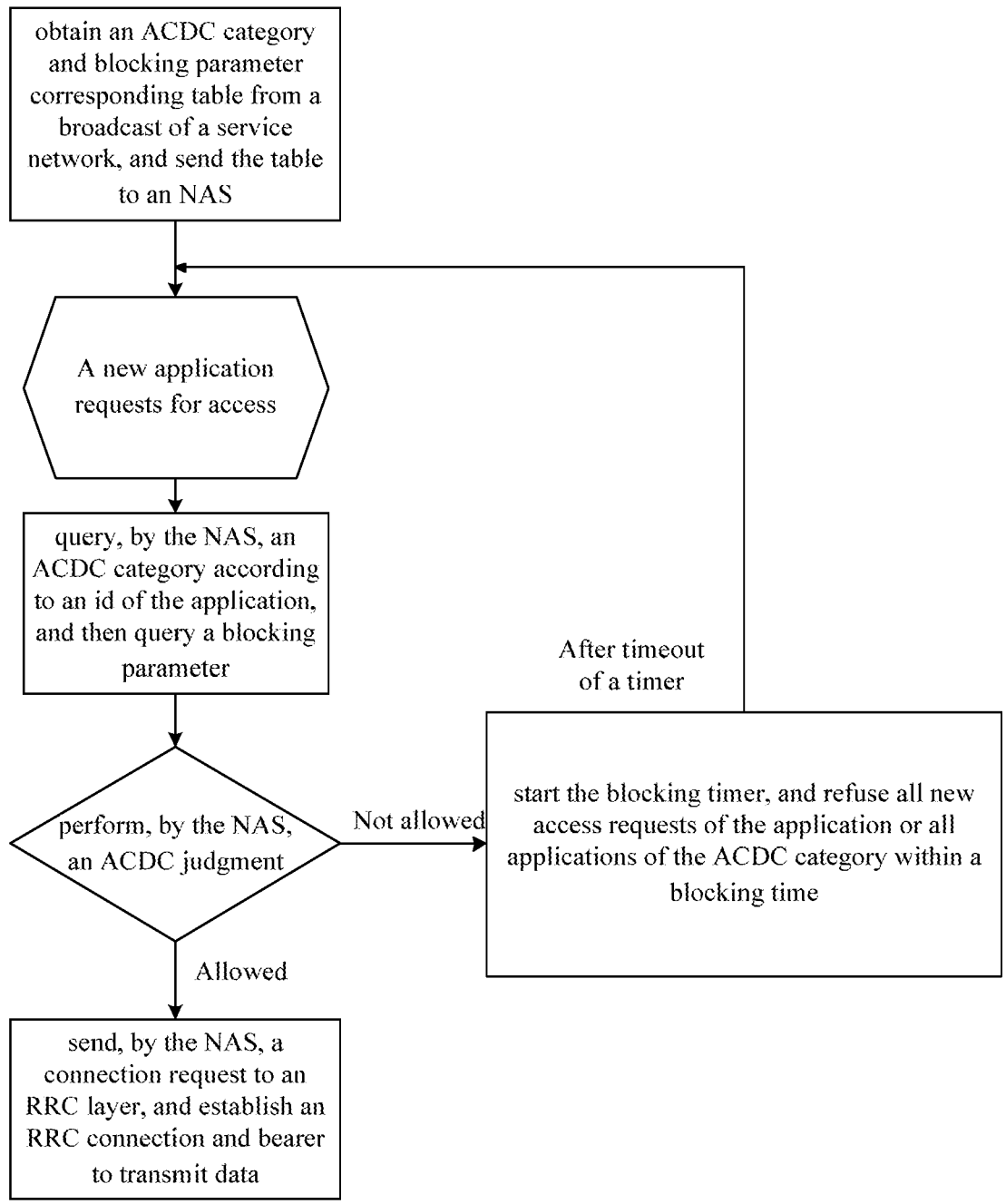
FIG. 5 is a flowchart of an NAS-based access control method applied to UE side when UE is in an idle state according to an embodiment of the disclosure.

As shown in FIG. 5, in the idle state, a detailed flow of the access control method is as follows.

The UE obtains the application id and ACDC category corresponding table from the home network for storage in a SIM card or another place, and the NAS may read the information; the UE reads the correspondence table of ACDC categories and blocking parameters from a broadcast message of the service network, and sends the correspondence table of ACDC categories and blocking parameters to the NAS; when there is an application initiating an access request in the UE, the NAS queries an ACDC category according to an id of the application, and accordingly queries the correspondence table of ACDC categories and blocking parameters; the NAS executes an ACDC judgment according to a blocking parameter, and when access is allowed, the NAS sends a connection request to the RRC layer, and establishes an RRC connection and bearer to transmit data; and when access is refused, the NAS refuses the connection request of application software, the blocking timer is started, and new access requests of the application or all applications of the ACDC category within the blocking time are all refused.

Figure 6:
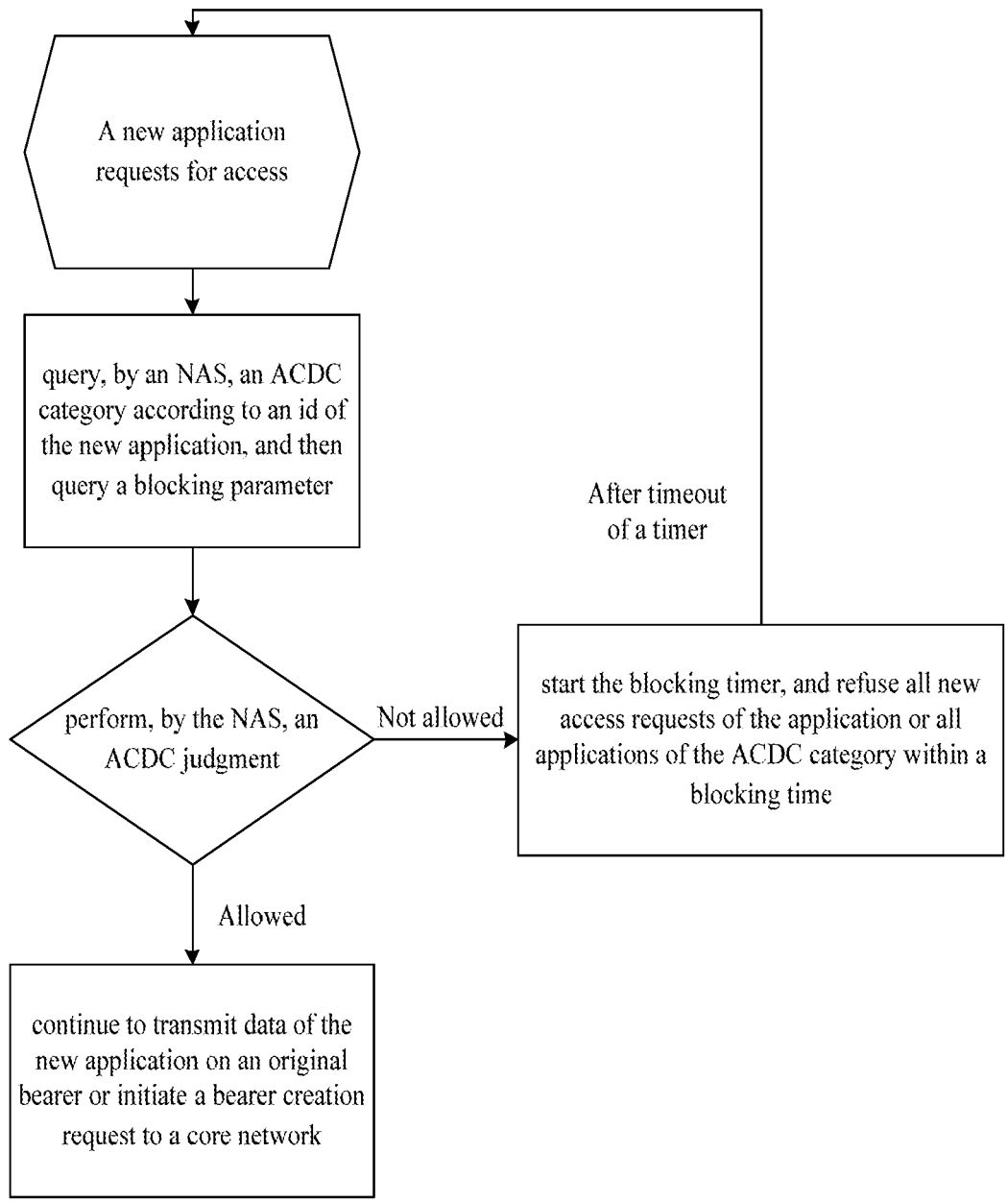
FIG. 6 is a flowchart of an NAS-based access control method applied to UE side according to embodiment 1 of the disclosure.

As shown in FIG. 6, an implementation flow of the access control method in embodiment 1 in the NAS of the UE is as follows.

When the UE is in the connected state, when there is a new application requesting for access, the NAS queries an ACDC category according to an id of the new application, and then performs query to obtain a blocking parameter of the new application; the NAS makes an ACDC judgment according to the blocking parameter, and when it is indicated by the judgment that access is allowed, the NAS continues transmitting data of the new application on an original bearer or initiates a bearer creation request to an MME; and when access is refused, the NAS refuses the connection request of the application, the blocking timer is started, and new access requests of the application or all applications of the ACDC category within the blocking time are all refused.

Figure 7:
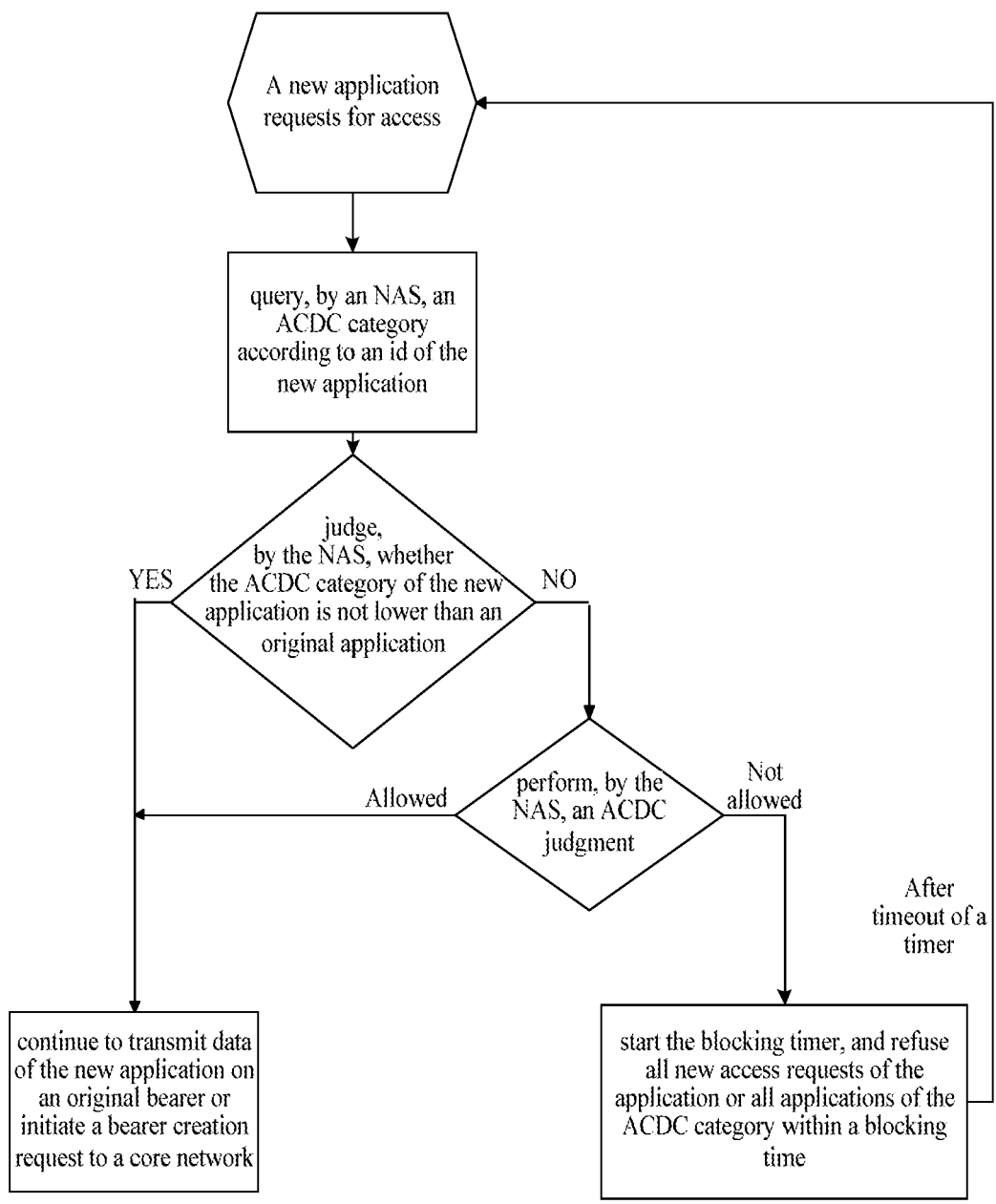
FIG. 7 is a flowchart of an NAS-based access control method applied to UE side according to embodiment 2 of the disclosure.

As shown in FIG. 7, an implementation flow of the access control method in embodiment 2 in the NAS of the UE is as follows.

When the UE is in the connected state, when there is a new application requesting for access, the NAS queries an ACDC category according to an id of the new application; the NAS judges whether the ACDC category of the new application is not lower than an original application or not; when the ACDC category of the new application is not lower than the original application, the NAS continues transmitting data of the new application on an original bearer or initiates a bearer creation request to the MME; when the ACDC category of the new application is lower than the original application, a blocking parameter of the new application is acquired, and an ACDC judgment is made; when it is indicated by the judgment that access is allowed, the NAS continues transmitting the data of the new application on the original bearer or initiates the bearer creation request to the MME; and when access is refused, the NAS refuses the connection request of the application, the blocking timer is started, and new access requests of the application or all applications of the ACDC category within the blocking time are all refused.

An implementation flow of the access control method of embodiment 3 in the NAS of the UE is similar to the implementation flow of the access control method of embodiment 2 in the NAS of the UE, and thus will not be described herein in detail.

2: when the access control method is applied to the RRC layer of the UE

A specific implementation manner of Step 100 in embodiment 1, embodiment 2 or embodiment 3 is the same as an implementation manner of the access control method applied to the NAS of the UE. A specific implementation process of Step 200 includes the following steps.

In Step 210, a network connection request of the second application and the ACDC category corresponding to the second application are received from the NAS, where the ACDC category corresponding to the second application is obtained by the NAS through searching the application and ACDC category corresponding table configured by the local network according to the identification information.

In Step 220, the correspondence table of ACDC categories and blocking parameters, acquired from the broadcast of the service network, is searched, according to the ACDC category, for a blocking parameter corresponding to the ACDC category of the second application.

When the priority of the category of the new application is not lower than the priority of the ACDC category of the original application or the ACDC judgment allows, a specific implementation manner of Step 400 is that: the RRC layer sends information indicating that the second application is allowed to access the network to the NAS to enable the NAS to establish the second connection between the UE and the network for the second application or allow the second application to deliver the information on the first connection.

Figure 8:
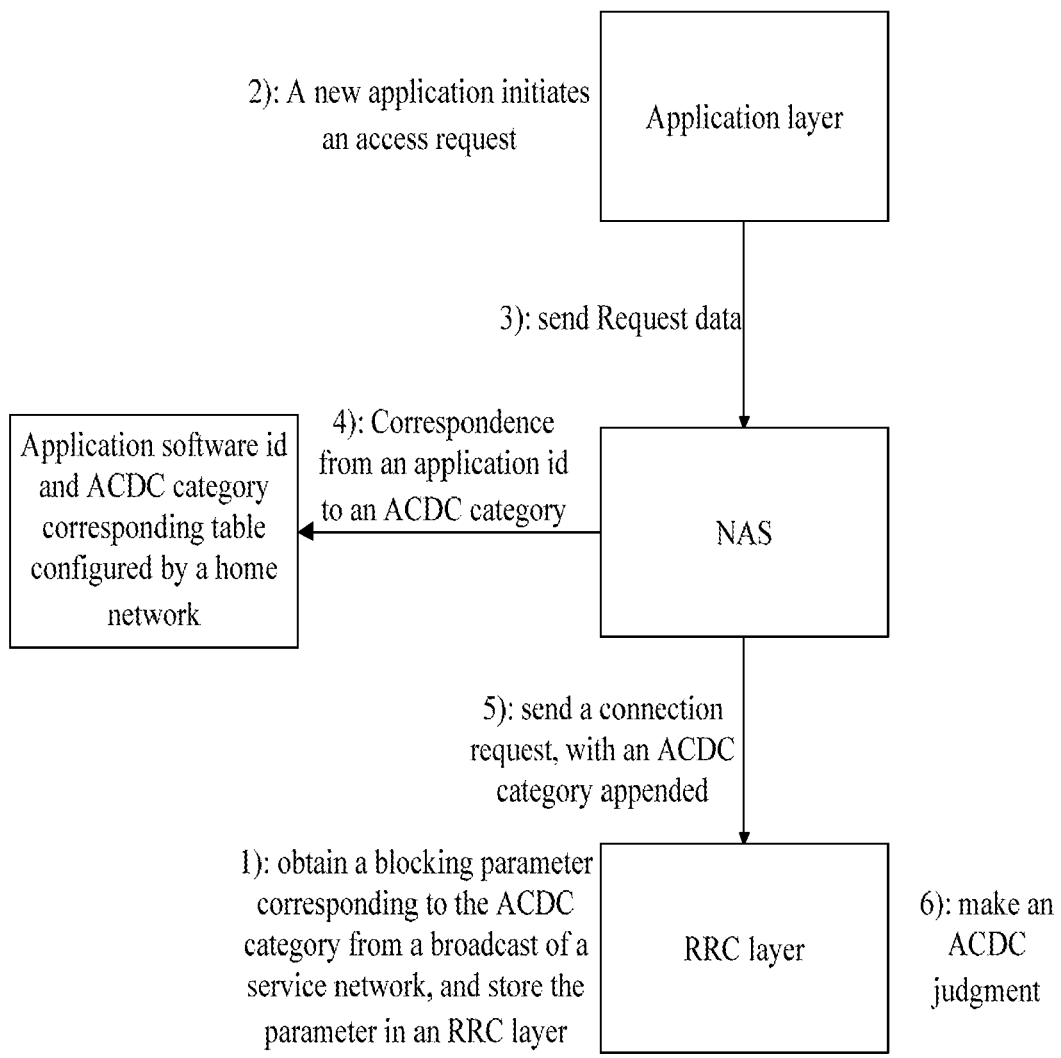
FIG. 8 is a flowchart of RRC-based ACDC judgment interlayer signaling of an access control method applied to UE side.

As shown in FIG. 8, when the UE is in the idle state and there is an application required to perform network communication, a transmission process of NAS-based ACDC judgment interlayer signaling is as follows:

1) the UE obtains a blocking parameter corresponding to an ACDC category from the broadcast of the service network, and stores it in the RRC layer;

2) the application layer receives an access request initiated by the new application;

3) the application layer sends request data of the new application to the NAS;

4) the NAS acquires the application id (i.e. identification information of the application) and ACDC category corresponding table configured by the home network;

5) the NAS transmits a connection request of the new application and the ACDC category of the new application to the RRC layer; and 6) an ACDC judgment is made in the RRC layer according to the ACDC category of the new application and the blocking parameter corresponding to the ACDC category of the new application.

Figure 9:
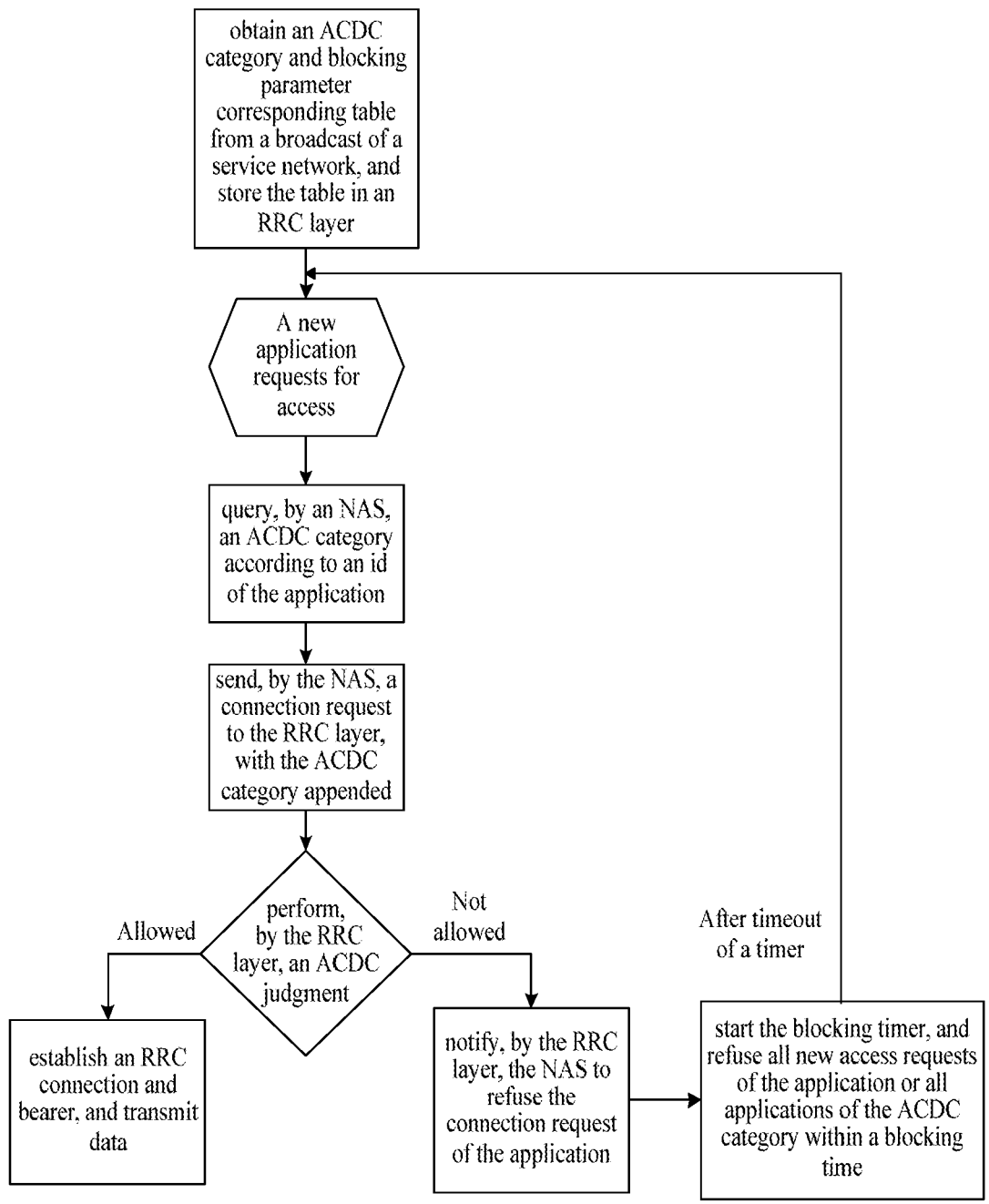
FIG. 9 is a flowchart of an RRC-based access control method applied to UE side when UE is in an idle state.

As shown in FIG. 9, in the idle state, a detailed flow of the access control method is as follows.

The UE obtains the application id and ACDC category corresponding table from the home network for storage in the SIM card or the other place, and the NAS may read the information; the UE reads the correspondence table of ACDC categories and blocking parameters from the broadcast message of the service network, and stores it in the RRC layer; when there is a new application initiating an access request in the UE, the NAS queries an ACDC category according to an id of the application, and then the NAS sends the ACDC category and a connection request of the application to the RRC layer; the RRC layer acquires a blocking parameter corresponding to the category from the correspondence table of ACDC categories and blocking parameters according to the ACDC category, executes an ACDC judgment according to the blocking parameter, and when access is allowed, establishes an RRC connection and bearer to transmit data; and when access is refused, the RRC layer notifies the NAS to refuse the connection request of the application, meanwhile, the blocking timer is started, and new access requests of the application or all applications of the ACDC category within the blocking time are all refused.

Figure 10:
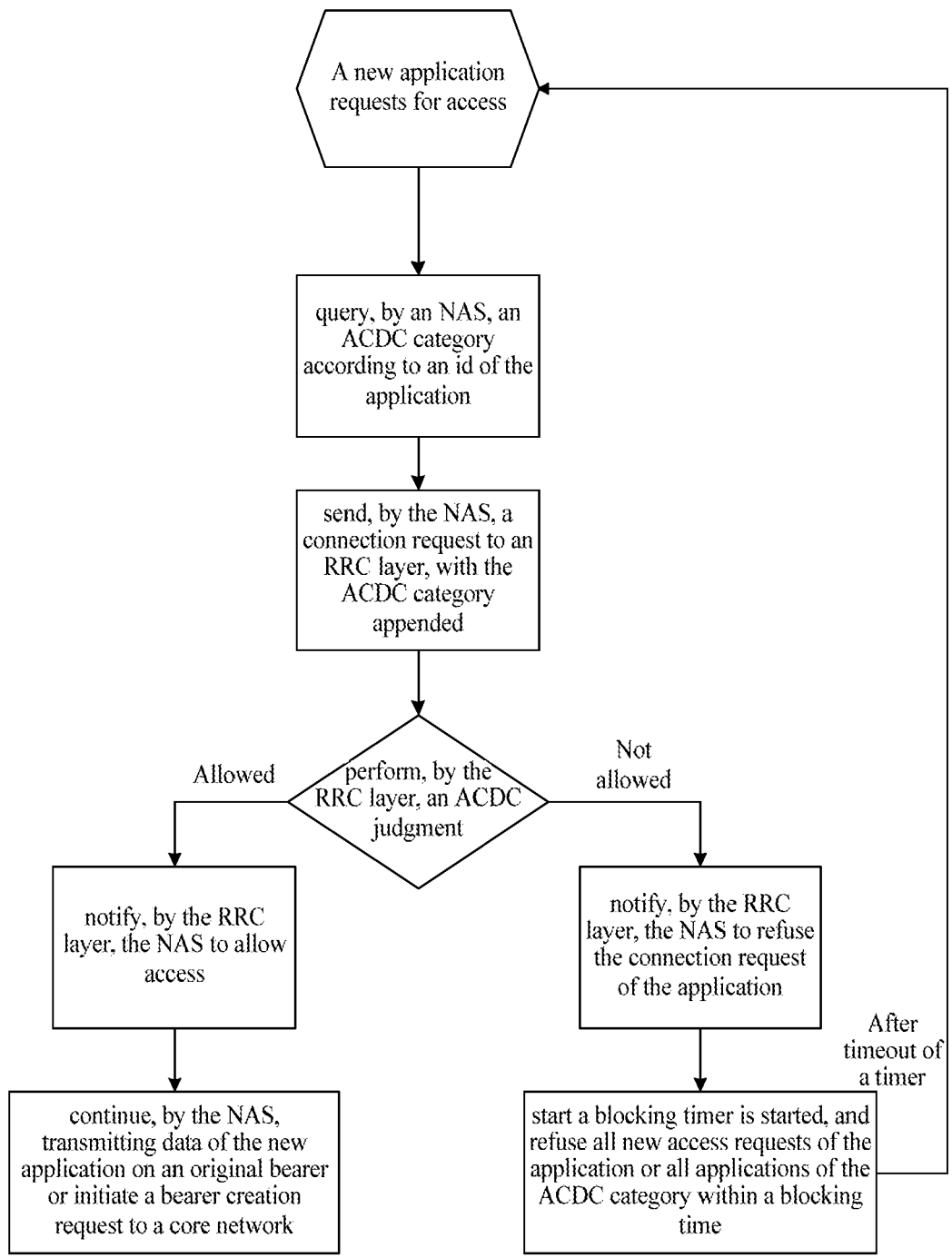
FIG. 10 is a flowchart of an RRC-based access control method applied to UE side according to embodiment 1 of the disclosure.

As shown in FIG. 10, an implementation flow of the access control method in embodiment 1 in the RRC layer of the UE is as follows.

When the UE is in the connected state, when there is a new application requesting for access, the NAS queries an ACDC category according to an id of the new application; the NAS sends a connection request of the application to the RRC layer, with the ACDC category of the application appended; the RRC layer performs query to obtain a blocking parameter of the new application according to the ACDC category of the application, and then makes an ACDC judgment according to the blocking parameter; when it is indicated by the judgment that access is allowed, the RRC layer notifies the NAS to allow access, and the NAS continues transmitting data of the new application on an original bearer or initiates a bearer creation request to the MME; and when access is refused, the RRC layer notifies the NAS to refuse the connection request of the application, the blocking timer is started, and new access requests of the application or all applications of the ACDC category within the blocking time are all refused.

Figure 11:
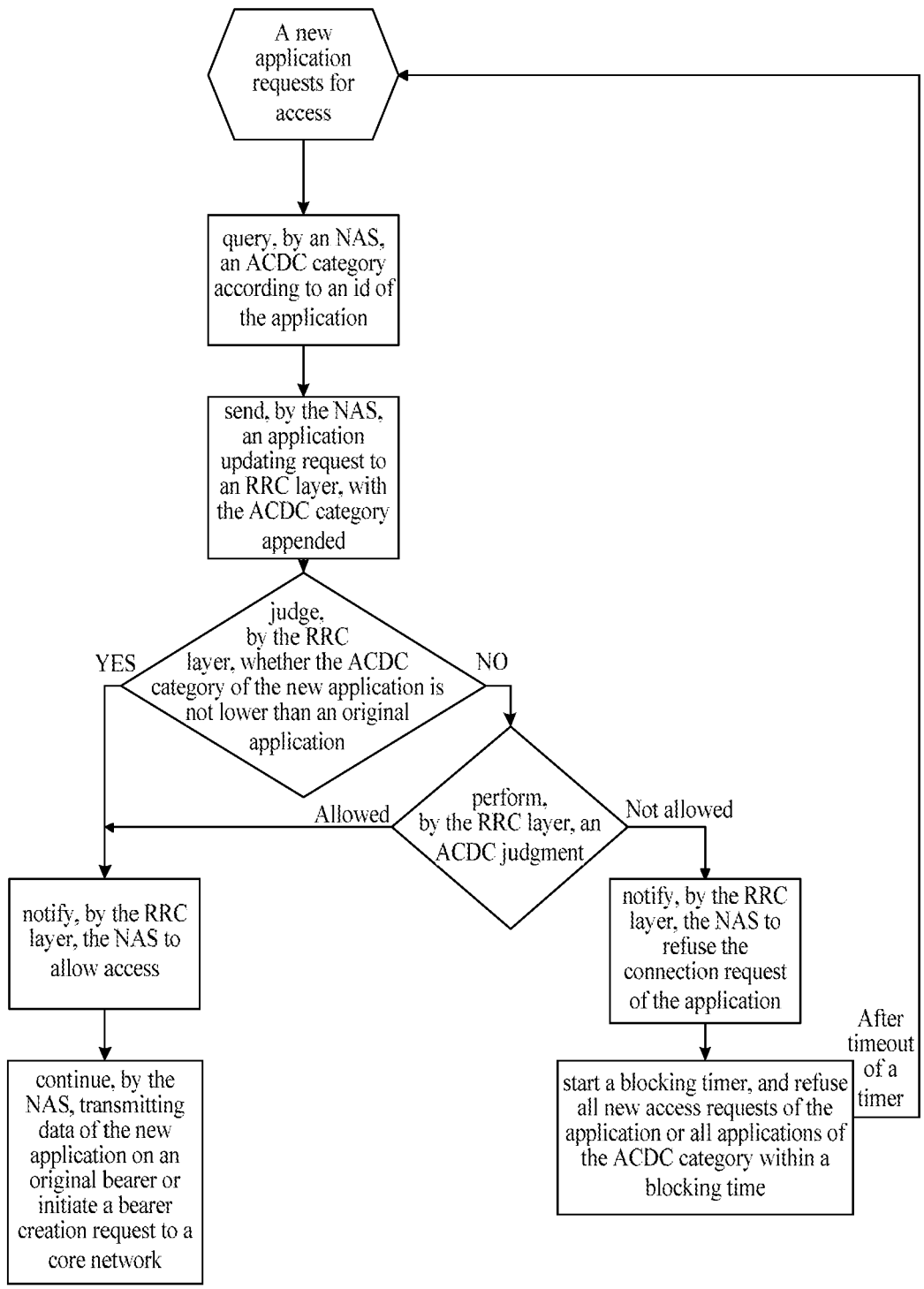
FIG. 11 is a flowchart of an RRC-based access control method applied to UE side according to embodiment 2 of the disclosure.

As shown in FIG. 11, an implementation flow of the access control method in embodiment 2 in the RRC layer of the UE is as follows.

When the UE is in the connected state, when there is a new application requesting for access, the NAS queries an ACDC category according to an id of the new application; the NAS sends a connection request of the application to the RRC layer, with the ACDC category of the application appended; the RRC layer judges whether the ACDC category of the new application is not lower than an original application or not; when the ACDC category of the new application is not lower than the original application, the RRC layer notifies the NAS to allow access, and the NAS continues transmitting data of the new application on an original bearer or initiates a bearer creation request to the MME; when the ACDC category of the new application is lower than the original application, the RRC layer performs query to obtain a blocking parameter of the new application according to the ACDC category of the application, and then makes an ACDC judgment according to the blocking parameter; when it is indicated by the judgment that access is allowed, the RRC layer notifies the NAS to allow access, and the NAS continues transmitting the data of the new application on the original bearer or initiates the bearer creation request to the MME; and when access is refused, the RRC layer notifies the NAS to refuse the connection request of the application, the blocking timer is started, and new access requests of the application or all applications of the ACDC category within the blocking time are all refused.

An implementation flow of the access control method of embodiment 3 in the RRC layer of the UE is similar to the implementation flow of the access control method of embodiment 2 in the RRC layer of the UE, and thus will not be described herein in detail.

It is important to note that, when the access control method is applied to the NAS, the data may be transmitted to the RRC layer only when the ACDC judgment of the NAS succeeds, and the RRC layer only forwards the data, so that a burden of the RRC layer may not be increased. It is important to note that, when the NAS processes relatively more data, the ACDC may be transferred to the RRC layer, so that load balance of each communication layer on the UE is achieved.

When the access control method is applied to the UE side, access of the UE to the network may be implemented only after the ACDC judgment succeeds. Such a manner avoids frequent communication between the UE and the network side and may prevent excessive occupation of a network link.

Second, when the access control method is applied to an eNB

In an ACDC judgment based on the eNB, the eNB of the service network is not required to broadcast the "correspondence table of ACDC categories and blocking parameters", and instead, stores the table in the eNB, and the network side may regulate the correspondence table of ACDC categories and blocking parameters in the eNB according to a current network congestion condition. In such a manner, accuracy of the ACDC judgment is ensured. It is important to note that, in a conventional art, the UE usually sends NAS signaling during an access request judgment for a new application, while the eNB may not parse the NAS signaling, and at this moment, the NAS signaling is required to be parsed through the MME. For avoiding disturbance to the MME, sent signaling of the UE side may be increased, the access request judgment for the new application is sent to the eNB in a manner of RRC-layer signaling, and the eNB may directly parse the RRC-layer signaling, so that excessive access to the MME is avoided.

1: when the access control method is applied to the eNB side without disturbance to the MME Step 100 in embodiment 1, embodiment 2 or embodiment 3 is specifically implemented as follows:

upon reception of RRC-layer signaling which is sent by the UE and contains an application establishment request of the second application and the identification information of the second application is received, the RRC-layer signaling is parsed to obtain the identification information or ACDC category of the second application.

When the eNB allows access of the application, the eNB directly sends, to the UE, the ACDC judgment result indicating that the second application is allowed to perform network communication to enable the UE to establish the second connection with the network or allow the second application to continue delivering the information on the first connection.

Figure 12:
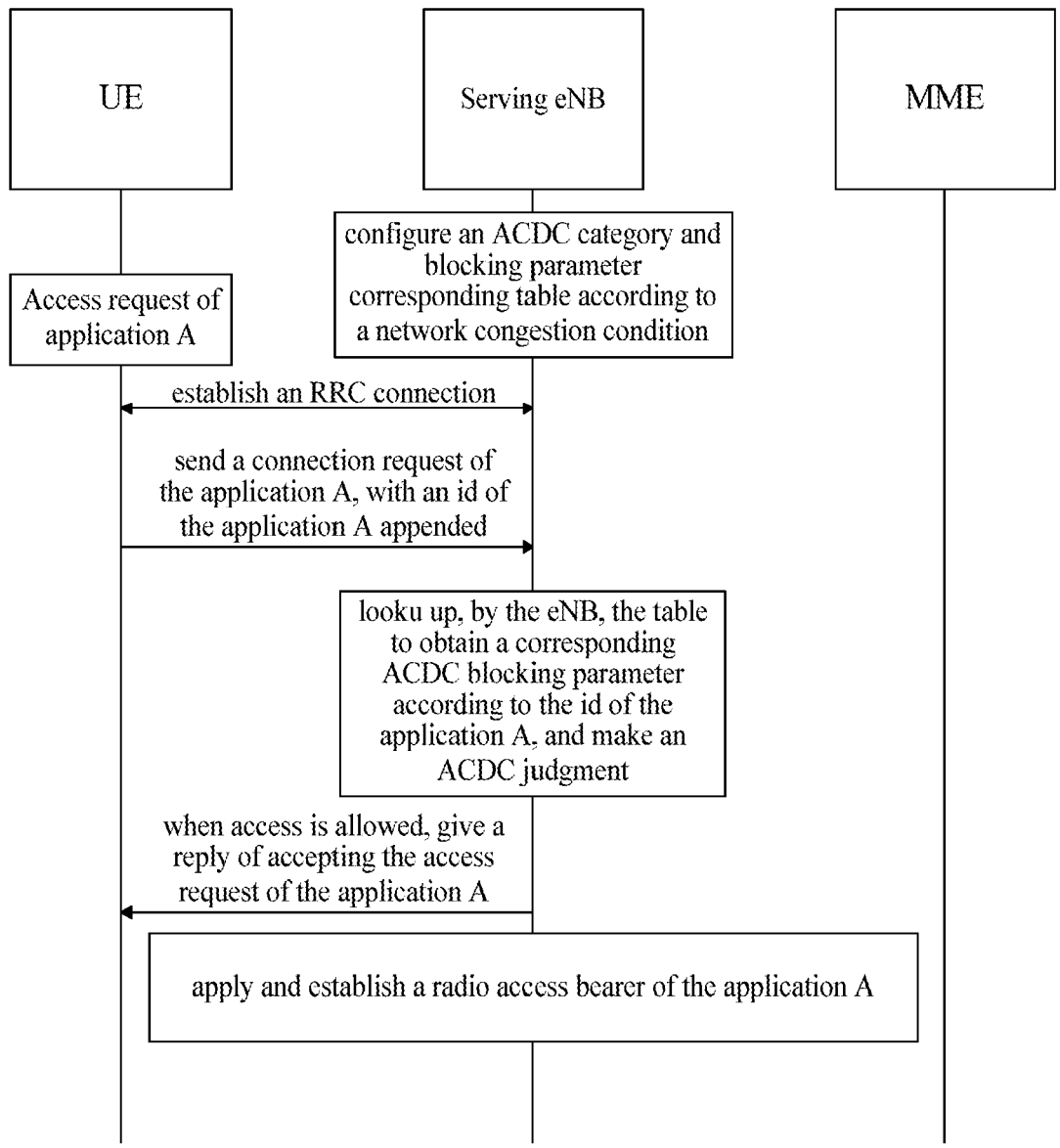
FIG. 12 is a flowchart of an access control method applied to an eNB side when UE is in an idle state according to an embodiment of the disclosure.

As shown in FIG. 12, the eNB configures the correspondence table of ACDC categories and blocking parameters according to a network congestion condition; when the UE is in the idle state, an application A in the UE initiates a service request, the UE establishes an RRC connection at first with the eNB, the UE sends an RRC-layer signaling access request, with an id of the application A appended, and the eNB queries a blocking parameter, and executes an ACDC judgment; the eNB feeds back a judgment result to the UE through RRC-layer signaling, and when access is allowed, feeds back signaling indicating that access of the application A is allowed to the UE, and establishes an RRC connection and bearer to start transmitting data of the application A; and when access is not allowed, the application A is not allowed to access again within the "blocking time" specified in the "blocking parameter".

Figure 13:
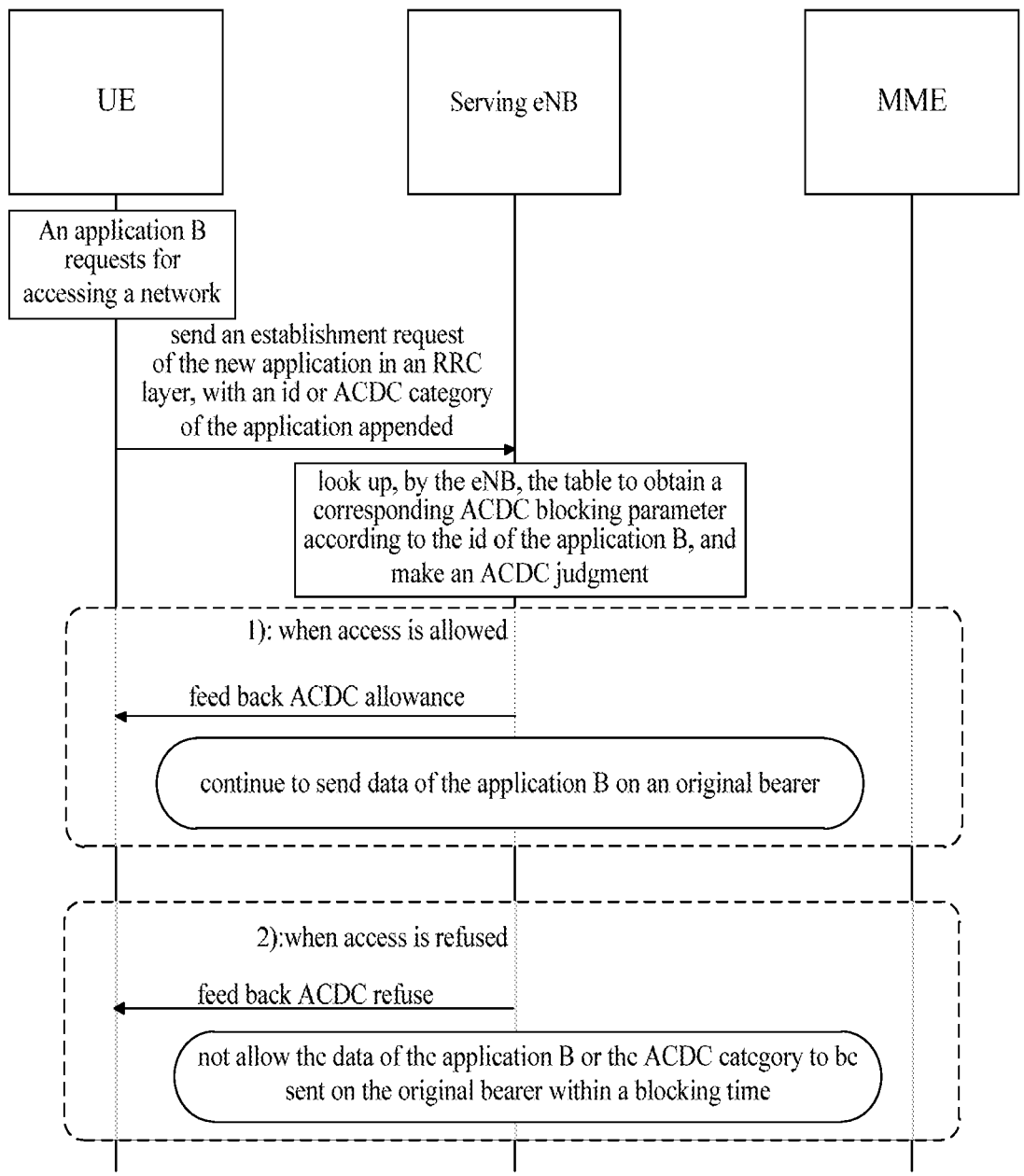
FIG. 13 is a flowchart of an access control method applied to an eNB side without disturbance to an MME when UE is in a connected state according to an embodiment of the disclosure.

As shown in FIG. 13, when the UE is in the connected state, a specific implementation process of the access control method of embodiment 1 on the eNB side (without disturbance to the MME) is as follows: there is a new application B requesting to access the network on the UE side, the eNB receives RRC-layer signaling sent by the UE, the RRC-layer signaling including a connection establishment request of the new application B and an id (which may also be an ACDC category of the application B) of the application B, and the eNB parses the RRC-layer signaling to obtain a blocking parameter, then makes an ACDC judgment, and feeds back a judgment result to the UE through RRC-layer signaling; when the judgment allows, RRC-layer signaling indicating that ACDC allows is fed back to enable the UE to continue sending data of the application B on an original bearer; and when the judgment does not allow, RRC-layer signaling indicating that ACDC refuses is fed back, and all data of the application B sent on the original bearer by the UE or the ACDC category is blocked within the blocking time.

It is important to note that, when the ACDC judgment manner without disturbance to the MME is adopted, it is necessary to add a protocol for the UE side to send an establishment request of the new application and the RRC-layer signaling appended with the id or ACDC category of the application.

Implementation manners of the access control methods of embodiment 2 and embodiment 3 on the base station side (without disturbance to the MME) are similar to the implementation manner of the access control method of embodiment 1 on the base station side (without disturbance to the MME), and thus will not be described herein in detail.

2: when the access control method is applied to the UE and the MME is required to assist in signaling parsing Step 100 in embodiment 1, embodiment 2 or embodiment 3 is specifically implemented as follows:

NAS signaling sent by the terminal and including a bearer establishment request of the second application or data of the second application sent on the first connection is acquired, and the NAS signaling is transmitted to the core network; and the identification information, obtained by the core network according to the NAS signaling, of the second application is received.

When the eNB allows access of the second application, the eNB sends, to the UE through the MME, the ACDC judgment result indicating that the second application is allowed to perform network communication to enable the terminal to establish the second connection with the network or allow the second application to continue delivering the information on the first connection.

Figure 14:
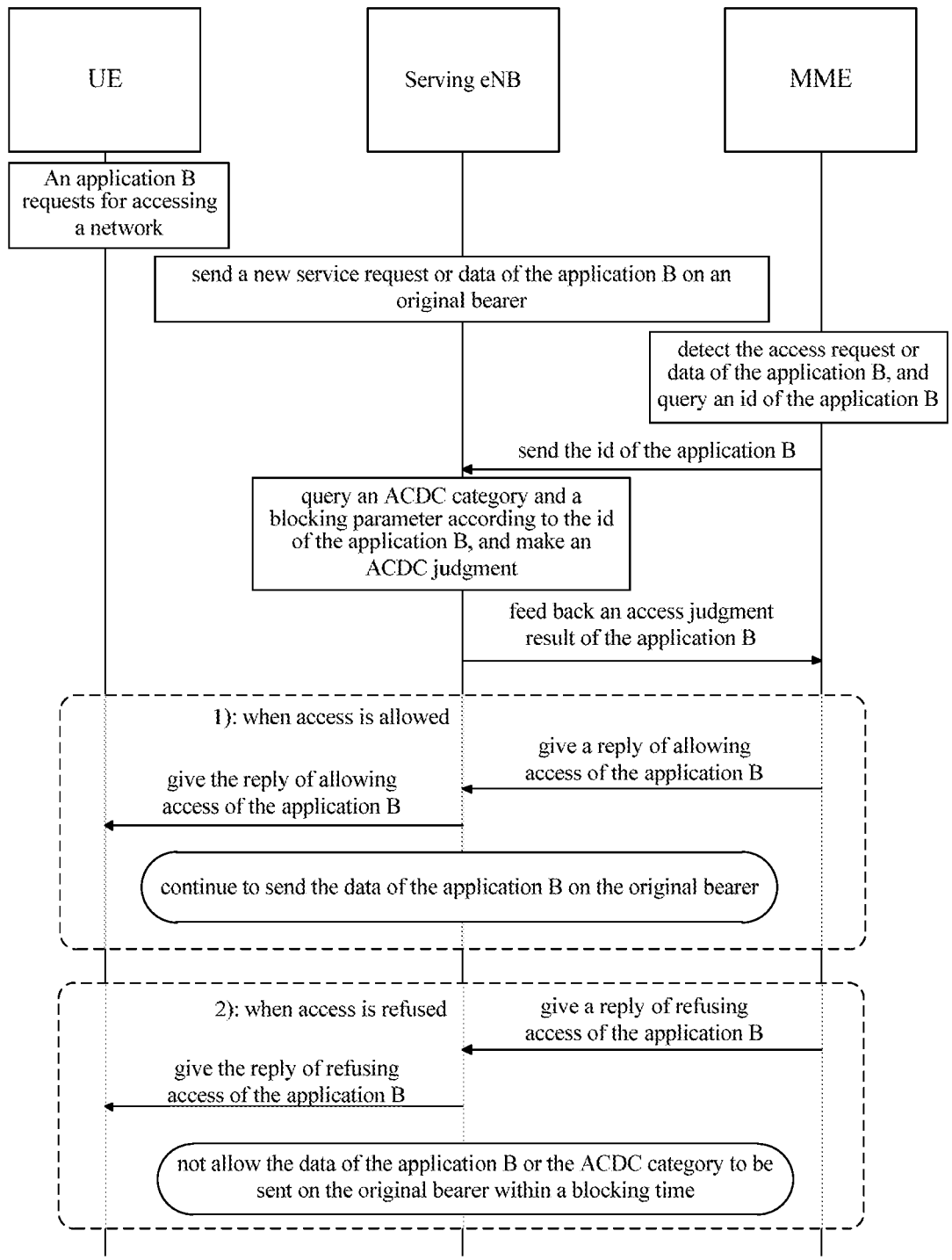
FIG. 14 is a flowchart of an access control method applied to an eNB side without disturbance to an MME when UE is in a connected state according to an embodiment of the disclosure.

It is important to note that, in such a manner, a processing manner adopted by the eNB when the UE is in the idle state is the same as the processing manner adopted when there is no disturbance to the MME and the UE is in the idle state. When the UE is in the connected state, as shown in FIG. 14, a specific implementation process of the access control method of embodiment 1 on the eNB side (with disturbance to the MME) is as follows: there is a new application B requesting to access the network on the UE side, the UE sends a new service request or data of the application B on the original bearer; when detecting the access request or data of the application B, the MME side queries an id of the application B, and sends the queried id of the application B to the eNB, and the eNB queries an ACDC category and blocking parameter of the application B according to the id of the application B, executes an ACDC judgment, and feeds back a judgment result to the MME; when the judgment allows, a message indicating that ACDC allows is fed back through the MME to enable the UE to continue sending data of the application B on the original bearer; and when the judgment does not allow, a message indicating that ACDC refuses is fed back through the MME, and all data of the application B sent on the original bearer by the UE or the ACDC category is blocked within the blocking time.

Implementation manners of the access control methods of embodiment 2 and embodiment 3 on the eNB side (with disturbance to the MME) are similar to the implementation manner of the access control method of embodiment 1 on the eNB side (with disturbance to the MME), and thus will not be described herein in detail.

It is important to note that, since the eNB side may generate the correspondence table of ACDC categories and blocking parameters in real time according to the network congestion condition, the ACDC judgment is made on the eNB side to make the ACDC judgment more accurate.

Third, when the access control method is applied to the MME

Step 100 in embodiment 1, embodiment 2 or embodiment 3 is specifically implemented as follows:

upon reception of the NAS signaling sent by the UE through the eNB and including the bearer establishment request of the second application or the data of the second application sent on the first connection, the identification information of the second application is acquired.

When access of the second application is allowed, the MME sends the ACDC judgment result indicating that the second application is allowed to perform network communication to the UE through the eNB to enable the UE to establish the second connection with the network or allow the second application to continue delivering the information on the first connection.

Figure 15:
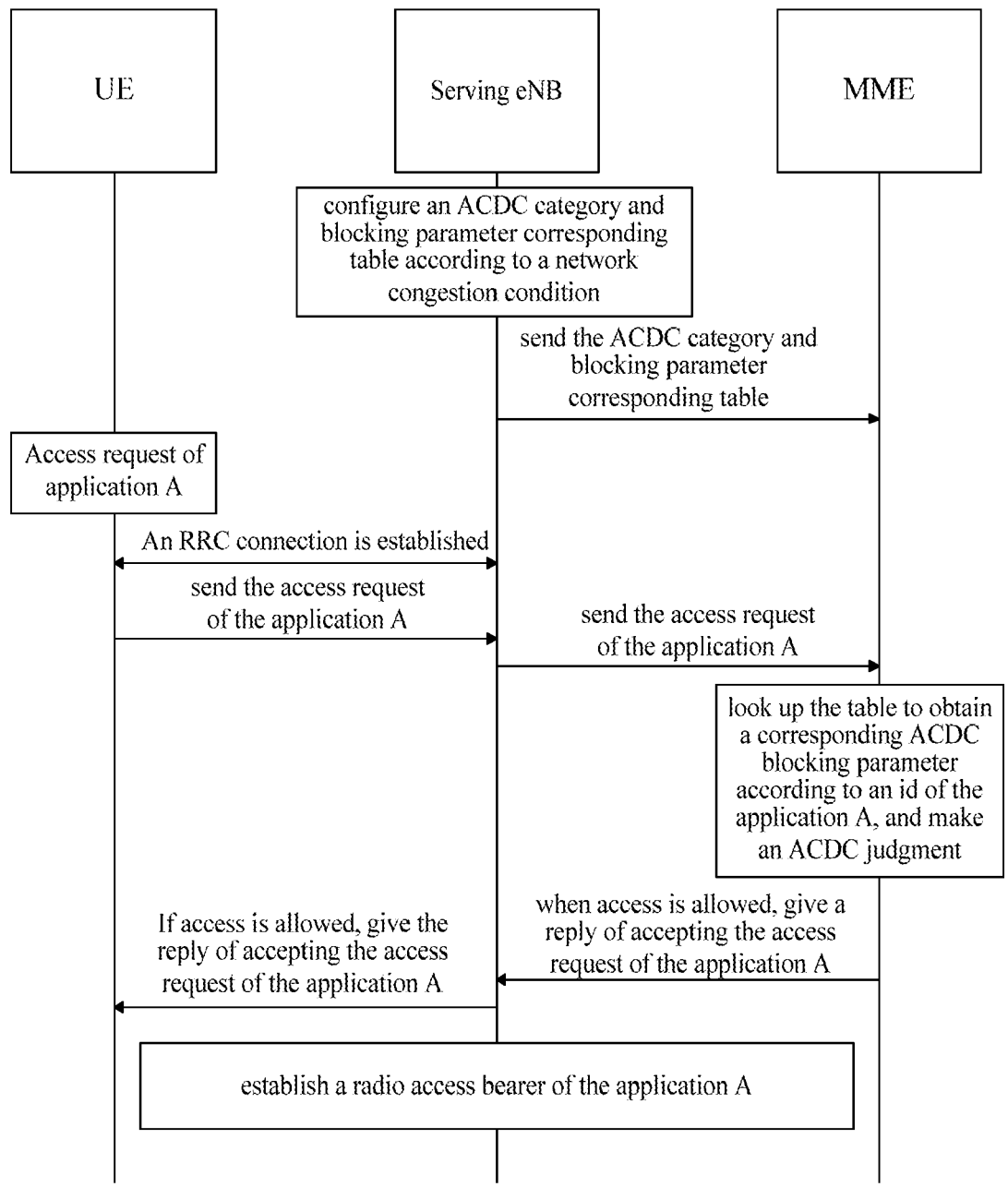
FIG. 15 is a flowchart of an access control method applied to an MME side when UE is in an idle state according to an embodiment of the disclosure.

As shown in FIG. 15, the eNB configures the correspondence table of ACDC categories and blocking parameters according to the network congestion condition, and sends the correspondence table of ACDC categories and blocking parameters to the MME; when the UE is in the idle state, an application A in the UE requests for accessing the network, the UE establishes an RRC connection at first, and then sends an access request of the application A to the MME through the eNB, and the MME queries a corresponding ACDC category and a corresponding blocking parameter according to an id of the application A, and executes an ACDC judgment; when access is allowed, the MME feeds back signaling indicating that access of the application A is allowed through the eNB, and establishes a radio access bearer of the application A; and when access is refused, the MME feeds back an instruction indicating that access of the application A is refused to the UE through the eNB, and the access request of the application A is always refused within the blocking time.

Figure 16:
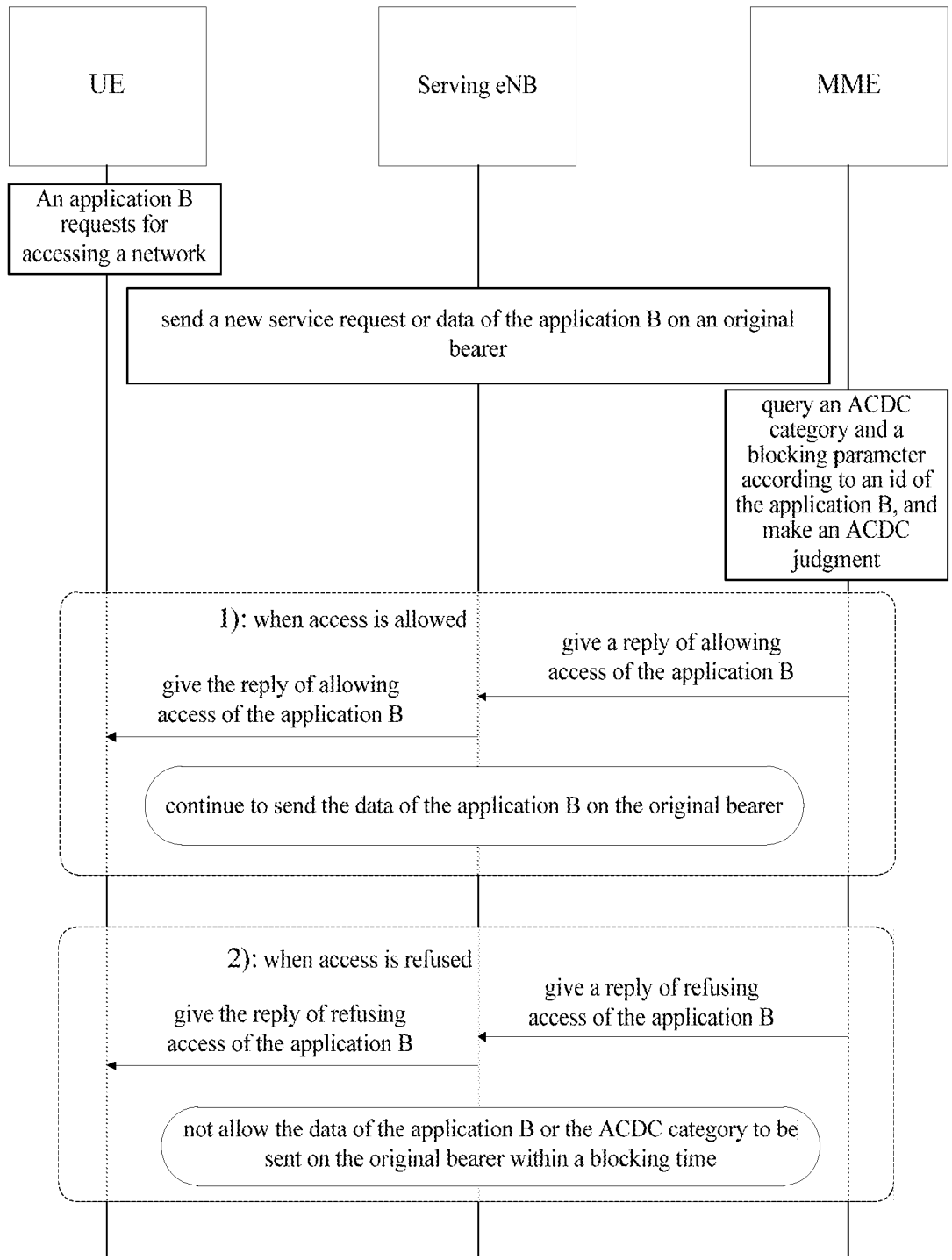
FIG. 16 is a flowchart of an access control method applied to an MME side when UE is in a connected state according to an embodiment of the disclosure.

As shown in FIG. 16, when the UE is in the connected state, a specific implementation process of the access control method of embodiment 1 on the MME side is as follows: there is a new application B requesting for accessing the network on the UE side, and the UE sends a new service request or data of the application B on an original bearer; when detecting the access request or data of the application B, the MME side queries an id of the application B, queries an ACDC category and blocking parameter of the application B according to the id of the application B, and executes an ACDC judgment; a judgment result is fed back to the UE through the eNB; when the judgment allows, a message indicating that ACDC allows is fed back through the eNB to enable the UE to continue sending the data of the application B on the original bearer; and when the judgment does not allow, a message indicating that ACDC refuses is fed back through the eNB, and all data of the application B sent on the original bearer by the UE or the ACDC category is blocked within the blocking time.

Implementation manners of the access control methods of embodiment 2 and embodiment 3 on the MME side are similar to the implementation manner of the access control method of embodiment 1 on the MME side, and thus will not be described herein in detail.

It is important to note that, when the access control method is applied to the MME, no changes are required on the UE and eNB sides, so that the access control method is relatively easy to implement.

Figure 17:
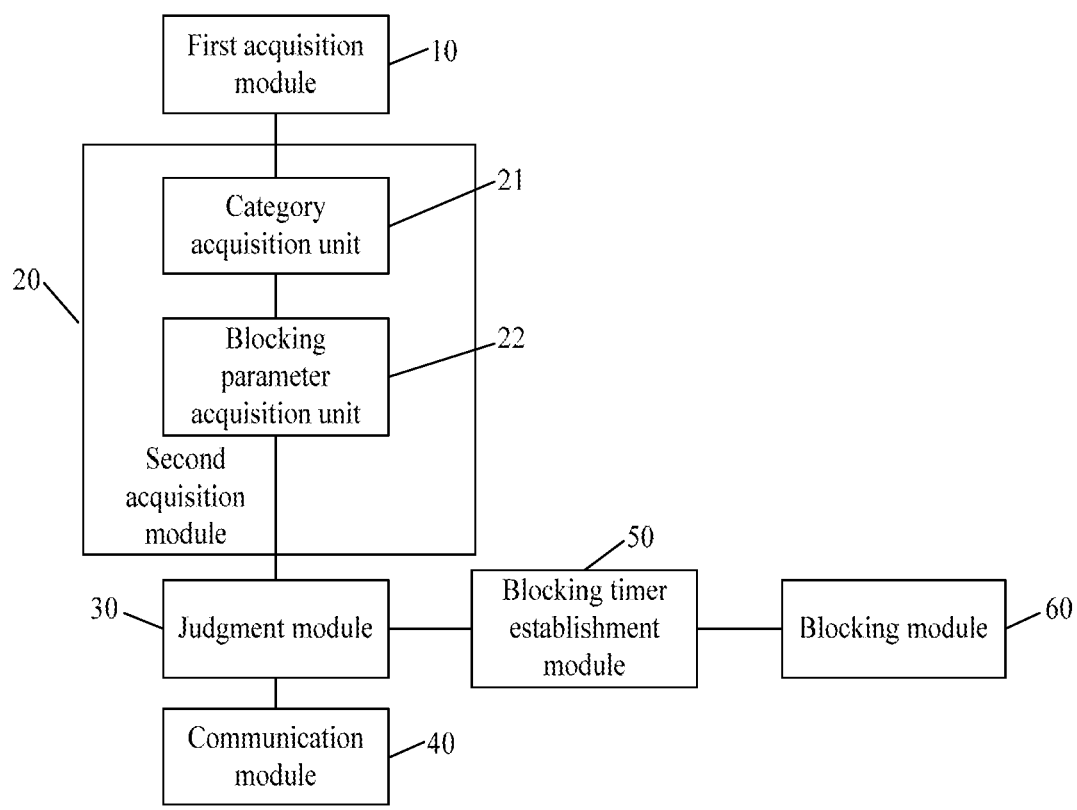
FIG. 17 is a module diagram of an access control device according to embodiment 4 of the disclosure.

As shown in FIG. 17, an access control device of embodiment 4 of the disclosure includes:

a first acquisition module 10, arranged to, after a first connection of a first application is established between a terminal and a network and before an ACDC judgment is made for a second application, acquire identification information of the second application;

a second acquisition module 20, arranged to acquire a blocking parameter of the second application according to the identification information;

a judgment module 30, arranged to make the ACDC judgment for the second application according to the blocking parameter, to obtain a judgment result indicating whether the second application is allowed to perform network communication; and a communication module 40, arranged to, when the judgment result indicates that the second application is allowed to perform network communication, establish a second connection between the terminal and the network for the second application or allow the second application to deliver information on the first connection.

Specifically, the second acquisition module 20 includes:

a category acquisition unit 21, arranged to acquire an ACDC category of the second application according to the identification information; and a blocking parameter acquisition unit 22, arranged to acquire the blocking parameter of the second application according to the ACDC category, wherein the blocking parameter includes at least one of a blocking time or a blocking probability.

When the judgment result indicates that the second application is not allowed to perform network communication, the access control device further includes:

a blocking timer establishment module 50, arranged to, when the judgment result indicates that the second application is not allowed to perform network communication, establish a blocking timer; and a blocking module 60, arranged to block all network communication of the second application within a timing period of the blocking timer.

Figure 18:
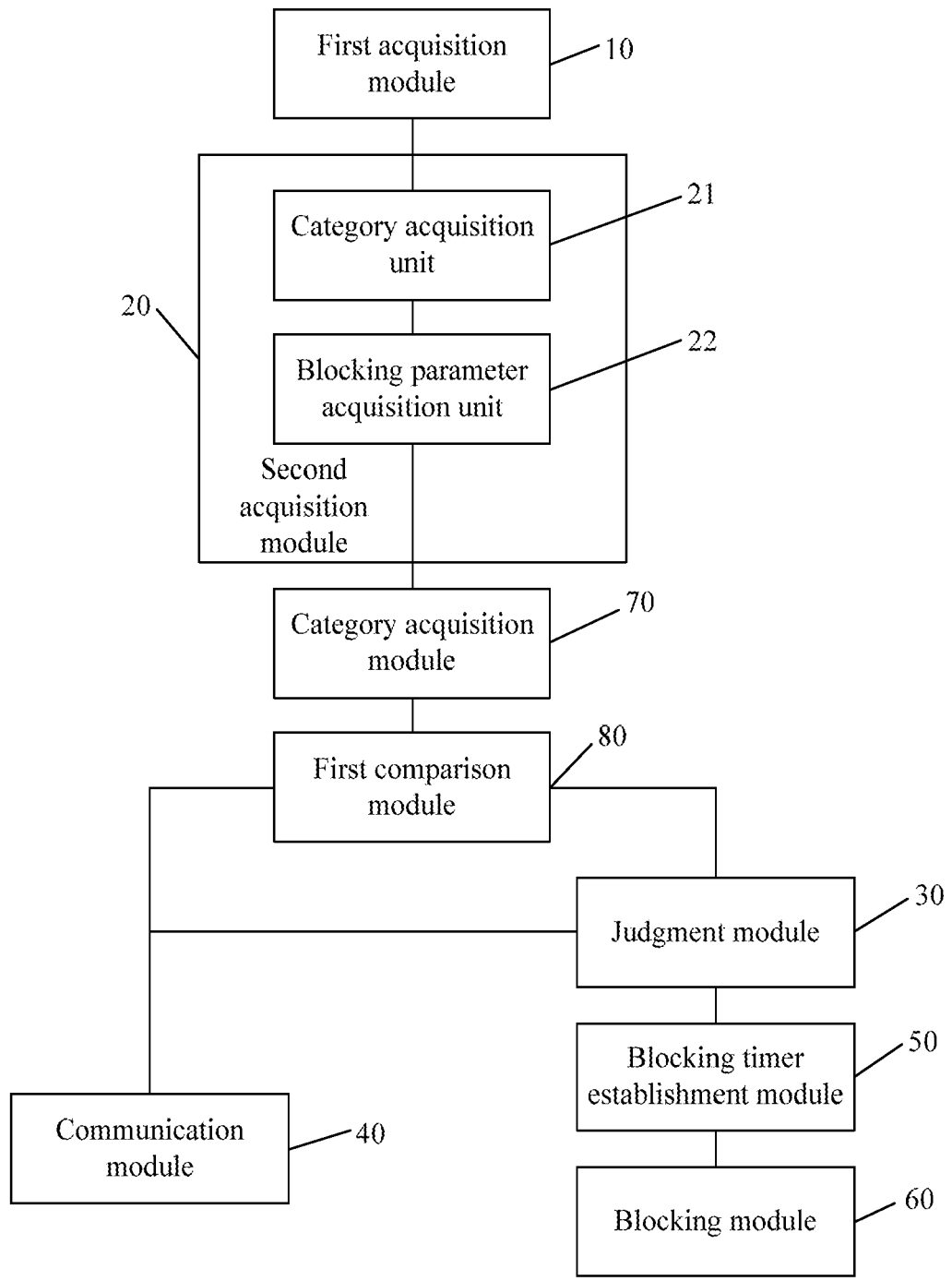
FIG. 18 is a module diagram of an access control device according to embodiment 5 of the disclosure.

As shown in FIG. 18, an access control device of embodiment 5 of the disclosure includes:

a first acquisition module 10, arranged to, after a first connection of a first application is established between a terminal and a network and before an ACDC judgment is made for a second application, acquire identification information of the second application;

a second acquisition module 20, arranged to acquire a blocking parameter of the second application according to the identification information;

a judgment module 30, arranged to make the ACDC judgment for the second application according to the blocking parameter, to obtain a judgment result indicating whether the second application is allowed to perform network communication; and a communication module 40, arranged to, when the judgment result indicates that the second application is allowed to perform network communication, establish a second connection between the terminal and the network for the second application or allow the second application to deliver information on the first connection.

Specifically, the second acquisition module 20 includes:

a category acquisition unit 21, arranged to acquire an ACDC category of the second application according to the identification information; and a blocking parameter acquisition unit 22, arranged to acquire the blocking parameter of the second application according to the ACDC category, wherein the blocking parameter includes at least one of a blocking time or a blocking probability.

When the judgment result indicates that the second application is not allowed to perform network communication, the access control device further includes:

a blocking timer establishment module 50, arranged to, when the judgment result indicates that the second application is not allowed to perform network communication, establish a blocking timer; and a blocking module 60, arranged to block all network communication of the second application within a timing period of the blocking timer.

Wherein, the access control device further includes:

a category acquisition module 70, arranged to acquire an ACDC category of the first application, and a first comparison module 80, arranged to compare a priority of the ACDC category of the second application with a priority of the ACDC category of the first application;

when the priority of the ACDC category of the second application is lower than the priority of the ACDC category of the first application, the judgment module 30 makes the ACDC judgment for the second application according to the blocking parameter, to obtain the judgment result indicating whether the second application is allowed to perform network communication; and when the priority of the ACDC category of the second application is higher than or equal to the priority of the ACDC category of the first application, the communication module 40 establishes the second connection between the UE and the network for the second application or allow the second application to deliver the information on the first connection.

Figure 19:
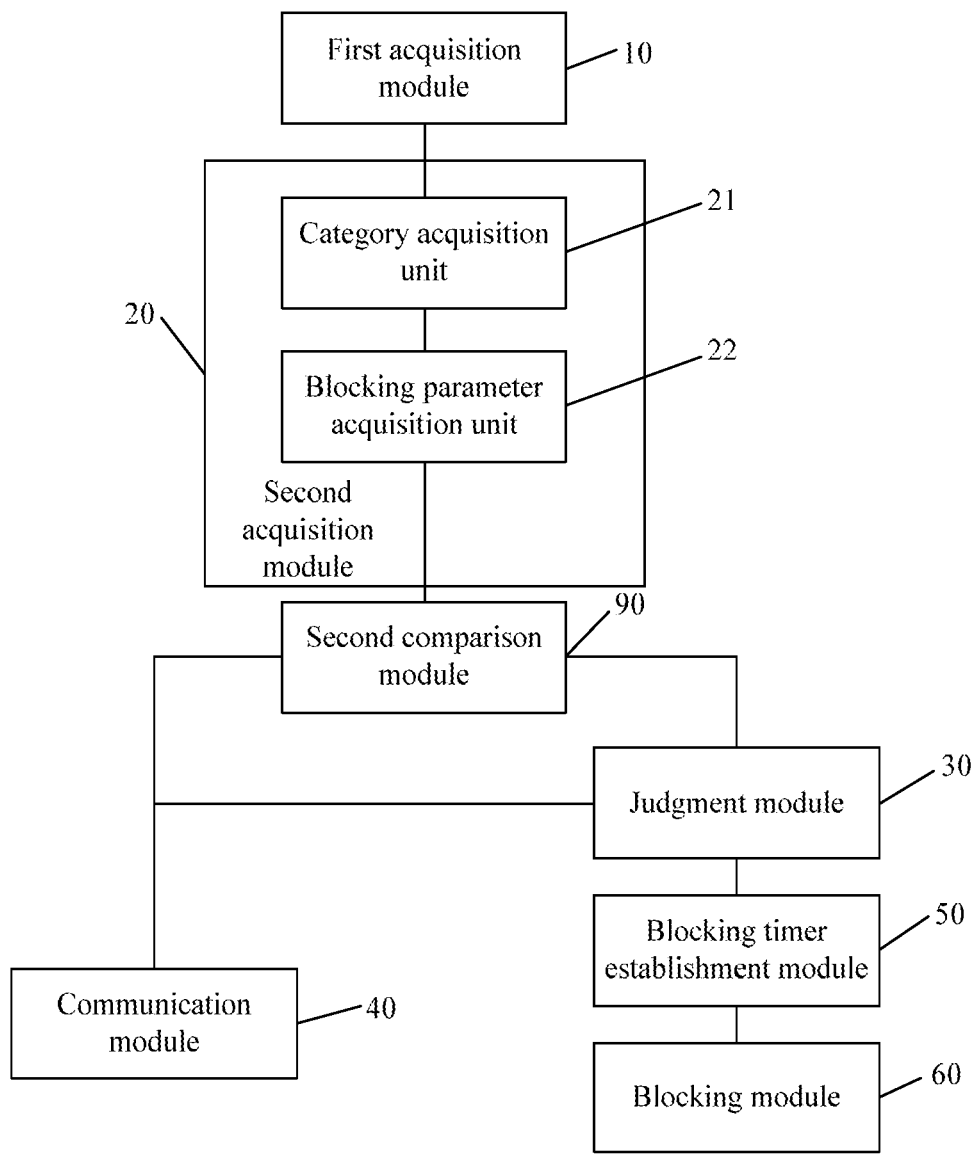
FIG. 19 is a module diagram of an access control device according to embodiment 6 of the disclosure.

As shown in FIG. 19, an access control device of embodiment 6 of the disclosure includes:

a first acquisition module 10, arranged to, after a first connection of a first application is established between a terminal and a network and before an ACDC judgment is made for a second application, acquire identification information of the second application;

a second acquisition module 20, arranged to acquire a blocking parameter of the second application according to the identification information;

a judgment module 30, arranged to make the ACDC judgment for the second application according to the blocking parameter, to obtain a judgment result indicating whether the second application is allowed to perform network communication; and a communication module terminal, arranged to, when the judgment result indicates that the second application is allowed to perform network communication, establish a second connection between the UE and the network for the second application or allow the second application to deliver information on the first connection.

Specifically, the second acquisition module 20 includes:

a category acquisition unit 21, arranged to acquire an ACDC category of the second application according to the identification information; and a blocking parameter acquisition unit 22, arranged to acquire the blocking parameter of the second application according to the ACDC category, wherein the blocking parameter includes at least one of a blocking time or a blocking probability.

When the judgment result indicates that the second application is not allowed to perform network communication, the access control device further includes:

a blocking timer establishment module 50, arranged to, when the judgment result indicates that the second application is not allowed to perform network communication, establish a blocking timer; and a blocking module 60, arranged to block all network communication of the second application within a timing period of the blocking timer.

Wherein, the access control device further includes:

a second comparison module 90, arranged to compare a priority of the ACDC category of the second application with a priority of a preset ACDC category;

when the priority of the ACDC category of the second application is lower than the priority of the preset ACDC category, the judgment module 40 makes the ACDC judgment for the second application according to the blocking parameter, to obtain the judgment result indicating whether the second application is allowed to perform network communication; and when the priority of the ACDC category of the second application is higher than or equal to the priority of the preset ACDC category, the communication module 40 establishes the second connection between the terminal and the network for the second application or allow the second application to deliver the information on the first connection.

The access control device may be arranged on the UE, may also be arranged on AN eNB, and may further be arranged on an MME.

(1) When the access control device belongs to an NAS of the UE

The first acquisition module 10 is specifically arranged to:

when a network access request of the second application is acquired, acquire the identification information of the second application.

The category acquisition unit 21 includes:

a first acquisition subunit, arranged to acquire an application and ACDC category corresponding table configured by a local network, where the application and ACDC category corresponding table includes identification information of all applications configured by the local network and an ACDC category corresponding to the identification information of each of the applications; and a second acquisition subunit, arranged to search, according to the identification information of the second application, the application and ACDC category corresponding table for the ACDC category of the second application corresponding to the identification information.

Furthermore, the second acquisition module 20 further includes:

a first acquisition unit, arranged to acquire a correspondence table of ACDC categories and blocking parameters, transmitted by an RRC layer and acquired from a broadcast of a service network, where the correspondence table of ACDC categories and blocking parameters includes ACDC categories and blocking parameter information corresponding to each of the ACDC categories; and the blocking parameter acquisition unit 22 is specifically arranged to:

acquire the blocking parameter of the second application from the correspondence table of ACDC categories and blocking parameters according to the ACDC category.

(2) When the access control device belongs to an RRC layer of the UE

The first acquisition module 10 is specifically arranged to:
when the network access request of the second application is acquired, acquire the identification information of the second application.

Furthermore, the category acquisition unit 21 is arranged to:

receive a network connection request of the second application and the ACDC category corresponding to the second application from the NAS, where the ACDC category corresponding to the second application is obtained by the NAC through searching the application and ACDC category corresponding table configured by the local network according to the identification information.

Specifically, the blocking parameter acquisition unit 22 is arranged to:

search, according to the ACDC category, the correspondence table of ACDC categories and blocking parameters acquired from the broadcast of the service network, for a blocking parameter corresponding to the ACDC category of the second application.

Specifically, the communication module 40 is arranged to:

send, to the NAS, information indicating that the second application is allowed to access the network to enable the NAS to establish the second connection between the terminal and the network for the second application or allow the second application to deliver the information on the first connection.

(3) When the access control device is arranged on the eNB, and communicates not through the MME The first acquisition module 10 is arranged to:

upon reception of RRC-layer signaling which is sent by the UE and contains an application establishment request of the second application and the identification information of the second application, parse the RRC-layer signaling to obtain the identification information or ACDC category of the second application.

Specifically, the communication module 40 is arranged to:

send, to the UE, the ACDC judgment result indicating that the second application is allowed to perform network communication to enable the UE to establish the second connection with the network or allow the second application to continue delivering the information on the first connection.

(4) When the access control device is arranged on the eNB, and communicates through the MME The first acquisition module 10 includes:

a signaling acquisition unit, arranged to acquire NAS signaling sent by the terminal and including a bearer establishment request of the second application or data of the second application sent on the first connection, and transmit the NAS signaling to the core network; and a receiving unit, arranged to receive the identification information, obtained by the core network according to the NAS signaling, of the second application.

Specifically, the communication module 40 is arranged to:

send, to the UE through the MME, the ACDC judgment result indicating that the second application is allowed to perform network communication to enable the UE to establish the second connection with the network or allow the second application to continue delivering the information on the first connection.

(5) When the access control device is arranged on the MME

The first acquisition module 10 is arranged to:

upon reception of the NAS signaling sent by the terminal through the eNB and including the bearer establishment request of the second application or the data of the second application sent on the first connection, acquire the identification information of the second application.

Specifically, the communication module 40 is arranged to:

send the ACDC judgment result indicating that the second application is allowed to perform network communication to the terminal through the eNB to enable the terminal to establish the second connection with the network or allow the second application to continue delivering the information on the first connection.

It is important to note that, according to the solutions of the disclosure, when each application accesses the network for the first time, an ACDC judgment corresponding to the application may be made, and such a manner solves the problem of free-riding of a low-priority application, facilitates respective control over different applications and ensures fairness of priorities between the applications.

The above is the optional implementation mode of the disclosure. It should be pointed out that those skilled in the art may further make a plurality of improvements and embellishments without departing from the principle of the disclosure and these improvements and embellishments shall also fall within the scope of protection of the disclosure.

The invention claimed is:

1. An access control method, performed by a terminal, the method comprising:
    after a first connection of a first application of the terminal is established between the terminal and a network and before an access control judgment is made for a second application of the terminal, when a network access request of the second application is acquired, acquiring identification information of the second application;
    acquiring a blocking parameter of the second application according to the identification information, comprising:
        acquiring an access control category of the second application according to the identification information; and
        acquiring the blocking parameter of the second application according to the access control category, wherein, the blocking parameter comprises at least one of a blocking time or a blocking probability;
    acquiring an access control category of the first application;
    comparing a priority of the access control category of the second application with a priority of the access control category of the first application;
    when the priority of the access control category of the second application is lower than the priority of the access control category of the first application, making the access control judgment for the second application according to the blocking parameter, to obtain a judgment result indicating whether the second application is allowed to perform network communication; and
    when the judgment result indicates that the second application is allowed to perform network communication, establishing a second connection between the terminal and the network for the second application or allowing the second application to deliver information on the first connection;
    when the judgment result indicates that the second application is not allowed to perform network communication, establishing a blocking timer; and
    blocking all network communication of the second application within a timing period of the blocking timer.

2. The access control method according to claim 1, wherein the first application and the second application are classified according to application software categories, or are classified according to service types.

3. The access control method according to claim 1, wherein before the action of making the access control judgment for the second application according to the blocking parameter to obtain the judgment result indicating whether the second application is allowed to perform network communication, the method further comprises:
    when the priority of the access control category of the second application is higher than or equal to the priority of the access control category of the first application, performing the action of establishing the second connection between the terminal and the network for the second application or allowing the second application to deliver the information on the first connection.

4. The access control method according to claim 1, wherein before the action of making the access control judgment for the second application according to the blocking parameter to obtain the judgment result indicating whether the second application is allowed to perform network communication, the method further comprises:
    comparing a priority of the access control category of the second application with a priority of a preset access control category;
    when the priority of the access control category of the second application is lower than the priority of the preset access control category, performing the action of making the access control judgment for the second application according to the blocking parameter, to obtain the judgment result indicating whether the second application is allowed to perform network communication; and
    when the priority of the access control category of the second application is higher than or equal to the priority of the preset access control category, performing the action of establishing the second connection between the terminal and the network for the second application or allowing the second application to deliver the information on the first connection.

5. The access control method according to claim 1, wherein the action of acquiring the access control category of the second application according to the identification information, comprises:
    acquiring an application and access control category corresponding table configured by the network, wherein the application and access control category corresponding table comprises identification information of all applications configured by the network and an access control category corresponding to identification information of each of the applications; and
    searching, according to the identification information of the second application, the application and access control category corresponding table for the access control category of the second application corresponding to the identification information.

6. The access control method according to claim 5, wherein before the action of acquiring the blocking parameter of the second application according to the access control category, the method further comprises:
acquiring a correspondence table of access control categories and blocking parameters, transmitted by a Radio Resource Control (RRC) layer and acquired from a broadcast of a service network, wherein the correspondence table of access control categories and blocking parameters comprises access control categories and blocking parameter information corresponding to each of the access control categories,
wherein the action of acquiring the blocking parameter of the second application according to the access control category, comprises:
acquiring the blocking parameter of the second application from the correspondence table of access control categories and blocking parameters according to the access control category.

7. The access control method according to claim 1, wherein the action of acquiring the access control category of the second application according to the identification information, comprises:
receiving, from a Non-Access Stratum (NAS), a network connection request of the second application and the access control category corresponding to the second application, wherein the access control category corresponding to the second application is obtained, by the NAS, through searching the application and access control category corresponding table configured by the network according to the identification information.

8. The access control method according to claim 7, wherein the action of acquiring the blocking parameter of the second application according to the access control category, comprises:
searching, according to the access control category, the correspondence table of access control categories and blocking parameters, acquired from the broadcast of the service network, for a blocking parameter corresponding to the access control category of the second application.

9. The access control method according to claim 8, wherein the action of establishing the second connection between the terminal and the network for the second application or allowing the second application to deliver the information on the first connection, comprises:
sending information indicating that the second application is allowed to access the network to the NAS, to enable the NAS to establish the second connection between the terminal and the network for the second application or allow the second application to deliver the information on the first connection.

10. An access control device, comprising a terminal, the device comprising a memory storing non-transitory computer-executable instructions; and a processor executing the non-transitory computer-executable instructions to implement a plurality of modules to perform steps of access control, wherein the steps comprises:
acquiring, after a first connection of a first application of a terminal is established between the terminal and a network and before an access control judgment is made for a second application of the terminal and in operation with first acquisition module, when a network access request of the second application is acquired, acquire identification information of the second application;
acquiring a blocking parameter of the second application according to the identification information in operation with second acquisition module; wherein the second acquisition module comprises:
a category acquisition module, arranged to acquire an access control category of the second application according to the identification information: and
a blocking parameter acquisition module, arranged to acquire the blocking parameter of the second application according to the access control category, wherein the blocking parameter comprises at least one of a blocking time or a blocking probability;
acquiring an access control category of the first application in operation with category acquisition module, and
comparing a priority of the access control category of the second application with a priority of the access control category of the first application in operation with first comparison module,
making, when the priority of the access control category of the second application is lower than the priority of the access control category of the first application in operation with judgement module, the access control judgment for the second application according to the blocking parameter, to obtain a judgment result indicating whether the second application is allowed to perform network communication; and
establishing when the judgment result indicates that the second application is allowed to perform network communication in operation with communication module, a second connection between the terminal and the network for the second application or allow the second application to deliver information on the first connection:
a blocking timer establishment module, arranged to, when the judgment result indicates that the second application is not allowed to perform network communication, establish a blocking timer; and
a blocking module, arranged to block all network communication of the second application within a timing period of the blocking timer.

11. The access control device according to claim 10, wherein the first application and the second application are classified according to application software categories, or are classified according to service types.

12. The access control device according to claim 10, further comprising:
when the priority of the access control category of the second application is higher than or equal to the priority of the access control category of the first application, the communication module establishes the second connection between the terminal and the network for the second application or allows the second application to deliver the information on the first connection.

13. The access control device according to claim 10, further comprising:
a second comparison module, arranged to compare a priority of the access control category of the second application with a priority of a preset access control category, wherein
when the priority of the access control category of the second application is lower than the priority of the preset access control category, the judgment module makes the access control judgment for the second application according to the blocking parameter, to obtain the judgment result indicating whether the second application is allowed to perform network communication; and
when the priority of the access control category of the second application is higher than or equal to the priority of the preset access control category, the communication module establishes the second connection between the terminal and the network for the second application or allows the second application to deliver the information on the first connection.

14. The access control device according to claim 10, wherein the category acquisition unit comprises:
 a first acquisition subunit, arranged to acquire an application and access control category corresponding table configured by a local network, wherein the application and access control category corresponding table comprises identification information of all applications configured by the local network and an access control category corresponding to the identification information of each of the applications; and
 a second acquisition subunit, arranged to search, according to the identification information of the second application, the application and access control category corresponding table for the access control category of the second application corresponding to the identification information.

\* \* \* \* \*